(12) United States Patent
Egorov et al.

(10) Patent No.: US 9,971,907 B2
(45) Date of Patent: *May 15, 2018

(54) ZERO-KNOWLEDGE DATABASES

(71) Applicant: ZeroDB, Inc., Santa Clara, CA (US)

(72) Inventors: Mikhail Egorov, Santa Clara, CA (US); MacLane Scott Wilkison, Mountain View, CA (US); Mohammad Ali Khan, Cupertino, CA (US)

(73) Assignee: ZeroDB, Inc., San Francisco, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/346,127

(22) Filed: Nov. 8, 2016

(65) Prior Publication Data
US 2017/0054716 A1 Feb. 23, 2017

Related U.S. Application Data

(63) Continuation of application No. 15/148,658, filed on May 6, 2016, now Pat. No. 9,519,798.
(Continued)

(51) Int. Cl.
| | |
|---|---|
| *G06F 21/62* | (2013.01) |
| *H04L 9/32* | (2006.01) |
| *G06F 21/14* | (2013.01) |
| *H04L 29/06* | (2006.01) |
| *G09C 1/00* | (2006.01) |
| *H04L 9/00* | (2006.01) |
| *H04L 9/14* | (2006.01) |
| *H04L 29/08* | (2006.01) |

(52) U.S. Cl.
CPC .......... *G06F 21/6227* (2013.01); *G06F 21/14* (2013.01); *G09C 1/00* (2013.01);
(Continued)

(58) Field of Classification Search
CPC ..... H04L 63/061; H04L 63/0428; H04L 9/14; H04L 9/3221; G06F 21/14
See application file for complete search history.

(56) References Cited

U.S. PATENT DOCUMENTS 5,577,240 A * 11/1996 Demers ............. G06F 17/30356
6,167,392 A * 12/2000 Ostrovsky ......... G06F 17/30949
(Continued)

OTHER PUBLICATIONS

R. A. Popa et al. "CryptDB: A Practical Encrypted Relational DBMS", MIT-CSAIL-TR-2011-005, Jan. 25, 2011, 15 pages.*
(Continued)

*Primary Examiner* — Robert Leung
(74) *Attorney, Agent, or Firm* — Pillsbury Winthrop Shaw Pittman LLP

(57) ABSTRACT

Provided is a process of operating a zero-knowledge encrypted database, the process including: obtaining a request for data in a database stored by an untrusted computing system, wherein the database is stored in a graph that includes a plurality of connected nodes, each of the nodes including: an identifier, accessible to the untrusted computing system, that distinguishes the respective node from other nodes in the graph; and an encrypted collection of data stored in encrypted form, wherein: the untrusted computing system does not have access to an encryption key to decrypt the collections of data, the encrypted collections of data in at least some of the plurality of nodes each include a plurality of keys indicating subsets of records in the database accessible via other nodes in the graph and corresponding pointers to identifiers of the other nodes.

26 Claims, 19 Drawing Sheets

Related U.S. Application Data

(60) Provisional application No. 62/158,195, filed on May 7, 2015, provisional application No. 62/181,505, filed on Jun. 18, 2015.

(52) U.S. Cl.
CPC ............... *H04L 9/00* (2013.01); *H04L 9/14* (2013.01); *H04L 9/3221* (2013.01); *H04L 63/0428* (2013.01); *H04L 63/061* (2013.01); *H04L 67/10* (2013.01); *H04L 2209/16* (2013.01)

(56) References Cited

U.S. PATENT DOCUMENTS

| | | | | |
|---|---|---|---|---|
| 8,751,826 | B2* | 6/2014 | O'Connor | H04L 9/0894 380/278 |
| 2005/0102326 | A1* | 5/2005 | Peleg | G06F 17/30312 |
| 2008/0209205 | A1* | 8/2008 | Rowley | H04L 9/321 713/153 |
| 2011/0131222 | A1* | 6/2011 | DiCrescenzo | G06F 17/30539 707/757 |
| 2011/0202764 | A1* | 8/2011 | Furukawa | G06F 21/6254 713/167 |
| 2014/0059345 | A1* | 2/2014 | Camenisch | H04L 9/3073 713/165 |
| 2014/0325217 | A1* | 10/2014 | Mori | G06F 21/6227 713/165 |
| 2015/0379062 | A1* | 12/2015 | Vermeulen | G06F 17/30371 707/691 |

OTHER PUBLICATIONS

International Searching Authority: International Preliminary Report on Patentability, PCT/US2016/031276, dated Nov. 7, 2017.*

* cited by examiner

ZERO-KNOWLEDGE DATABASES

CROSS-REFERENCE TO RELATED APPLICATIONS

This patent is a continuation of U.S. patent application Ser. No. 15/148,658, filed 6 May 2016, having the same title, which claims the benefit of U.S. Provisional Patent Application 62/158,195, having the same title, filed 7 May 2015, and U.S. Provisional Patent Application 62/181,505, having the same title, filed 18 Jun. 2015. The entire content of each of these earlier-filed applications, including the computer program listing filed with the '195 application, is hereby incorporated by reference for all purposes.

BACKGROUND

1. Field

The present invention relates generally to databases and, more specifically, to encrypted databases in which encryption keys are withheld from the system storing the database.

2. Description of the Related Art

In certain applications, database operators remain untrusted. Users of databases often prefer not to trust the operator of the database to protect the security of their stored data. In some cases, the database resides on computing systems operated by another entity, for instance, a remote data center operated by another company, and users prefer to not trust the other entity to protect the secrecy of their data. Or in some cases, users of databases prefer to constrain which portions of, and users of, their own computing systems have access to stored data (e.g., to reduce the likelihood of an unintentional release of secure information to an untrusted environment, such as in the event of a data breach).

Some existing systems for encrypting databases expose too much information to the hosting entity. For instance, some systems allow a database server to ascertain which database entries match one another and which database entries are greater than or less than one another. Exposure of this information can weaken the underlying encryption. In some cases, the search space for encryption keys can be reduced by an attacker by knowing the ordinality of database entries, and inferences can be drawn about database entries and usage based on matching values and ordinality.

Some systems remotely store encrypted files that may be sent to client devices, and some of these systems withhold the encryption keys for the files (e.g., in zero-knowledge cloud document storage systems). Such systems are often not well suited for database storage or usage because the bandwidth and latency associated with sending a full copy of the database or other record can be intolerable for users needing a relatively fast response to a query or other database transaction.

SUMMARY

The following is a non-exhaustive listing of some aspects of the present techniques. These and other aspects are described in the following disclosure.

Some aspects include process of operating a client-side of a zero-knowledge database, the process including: obtaining, with a first computing system, a request for data in a database stored by an untrusted computing system remote from the first computing system, wherein the database is stored in a graph that includes a plurality of connected nodes, each of the nodes including: an identifier, accessible to the untrusted computing system, that distinguishes the respective node from other nodes in the graph; and an encrypted collection of data stored in encrypted form by the untrusted computing system, wherein: the untrusted computing system does not have access to an encryption key to decrypt the collections of data, the encrypted collections of data in at least some of the plurality of nodes each include a plurality of keys indicating subsets of records in the database accessible via other nodes in the graph and corresponding pointers to identifiers of the other nodes, and the encrypted collections of data in at least some of the plurality of nodes each include records of the database, at least some of the records including the requested data; sending, from the first computing system to the untrusted computing system, a request for a first node of the graph stored by the untrusted computing system; receiving, with the first computing system, the encrypted collection of data of the first node; obtaining, with the first computing system, one or more decryption keys; decrypting, with the first computing system, the encrypted collection of data of the first node with at least some of the one or more decryption keys to obtain a first decrypted collection of data; selecting, with the first computing system, an identifier of a second node in the graph from the first decrypted collection of data based on correspondence between the requested data in the remotely stored database and a key in the first decrypted collection of data associated with the selected identifier; sending, from the first computing system to the untrusted computing system, a request for the second node with a transmission indicating the selected identifier; and receiving, with the first computing system, the encrypted collection of data of the second node; decrypting, with the first computing system, with at least some of the one or more decryption keys, the encrypted collection of data of the second node to obtain a second decrypted collection of data; and obtaining the requested data remotely stored in the database based on information in the second decrypted collection of data.

Some aspects include a process of operating a database, the process including: obtaining, with an untrusted computing system remote from a first computing system, a database storing in a graph that includes a plurality of connected nodes, each of the nodes including: an identifier, accessible to the untrusted computing system, that distinguishes the respective node from other nodes in the graph; and an encrypted collection of data stored in encrypted form by the untrusted computing system, wherein: the untrusted computing system does not have access to an encryption key to decrypt the collections of data, the encrypted collections of data in at least some of the plurality of nodes each include a plurality of keys indicating subsets of records in the database accessible via other nodes in the graph and corresponding pointers to identifiers of the other nodes, and the encrypted collections of data in at least some of the plurality of nodes each include records of the database, at least some of the records including the requested data; receiving a request for a first node among the plurality of connected nodes from the first computing system; sending the first node to the first computing system; receiving a request for a second node among the plurality of connected nodes from the first computing system; sending the second node to the first computing system; receiving an indication that the first computing system will write to, or has written to, the second node; in response to the indication, sending a message to a computing device storing at least part of the second node in cache memory indicating that values in cache memory are potentially inconsistent with the current version of the second node Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1A:
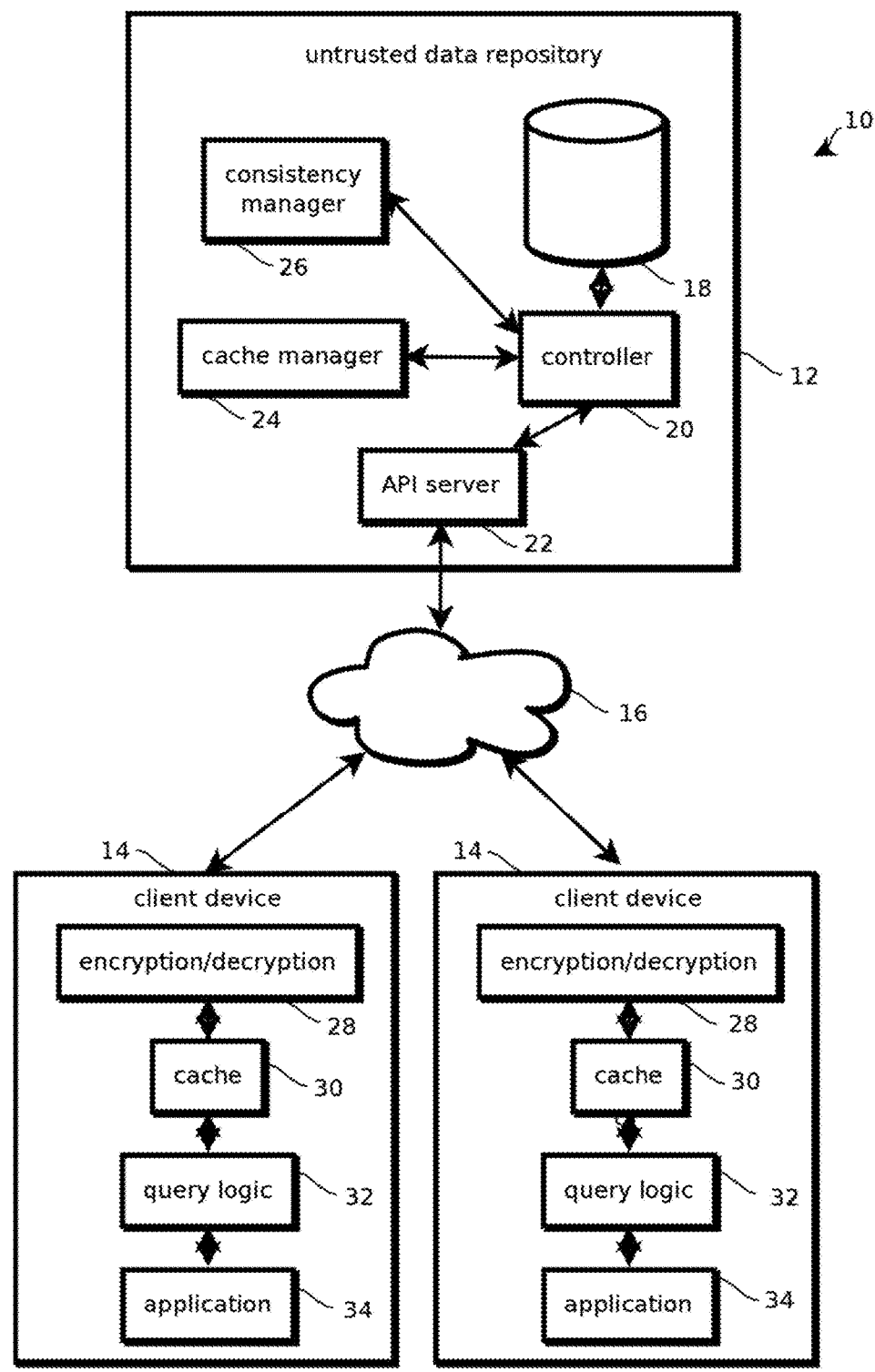
FIG. 1A is a block diagram depicting an example zero-knowledge database system.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of cryptography, cybersecurity, and database design. Indeed, the inventors wish to emphasize the difficulty of recognizing those problems that are nascent and will become much more apparent in the future should trends in the database security industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

FIG. 1A shows an example of a computing environment in which a remote, zero-knowledge, untrusted data repository 12 hosts data for client devices 14 that communicate with the data repository 12 via the Internet 16. In some embodiments, the data may be stored in encrypted nodes of a graph data structure, examples of which are described below with reference to FIGS. 1B and 1C. In some embodiments, the decryption keys may be stored by client devices 14, such that the data repository 12 (and entity operating the same) does not have access to the decryption keys. Consequently, in some embodiments, a hostile party with access to the data repository 12, for example, a hacker or rogue employee, cannot access the data stored in the data repository by users of client devices 14. Further, in some embodiments, the encrypted data may be stored in an encrypted format that obscures or entirely conceals the ordinality of, and matches between, stored database values. For example, the database values and graph edges may be stored in a nondeterministic encrypted format (e.g., with data grouped and or padded by appending random (e.g., pseudo random values) bit sequences), such that individual records cannot be compared in a way that leaks information to the operator of the untrusted data repository 12. In some cases, with nondeterministic encryption, identical values in different nodes may be represented by different bit sequences in the encrypted format (e.g., due to differences in padding applied to the same collections of values). In other embodiments, some leakage may be permitted, in the interest of various engineering and cost trade-offs, for example, by using deterministic encryption, as various other aspects described below are independently useful, such as various caching techniques described below.

The components of the computing environment 10 may be built from one or more of the computer systems described below with reference to FIG. 15. Further, such systems may include tangible, non-transitory, machine-readable media storing instructions that when executed by one or more computing processors effectuate the functionality described herein. In some cases, these computing devices may be communicatively connected to one another via various networks, such as the Internet 16, local area networks, cellular networks, and the like. In some cases, multiple client devices 14 may be connected by secure local networks, for example, in one or more computing systems that interface with the untrusted data repository 12, for instance, via the Internet 16. Or in some cases, the untrusted data repository 12 may reside within an ostensibly secure local area network with client devices 14. In some cases, the client devices 14 may execute processes described below with reference to FIGS. 1D and 1E to read and write data in the data repository 12, respectively.

In the illustrated embodiment, the untrusted data repository 12 is shown as a single component for purposes of simplicity, but in some embodiments, the untrusted data repository 12 may include a plurality of computing devices, including a plurality of virtual machines, Docker™ containers, uni-kernels, or the like. In some embodiments, the untrusted data repository 12 resides partially or entirely within a data center, for instance, within Microsoft's Azure service, Amazon's Elastic Compute Cloud service, or the like. In other examples, the untrusted data repository 12 may be formed by a plurality of the public's computing devices connected in a peer-to-peer network, for instance, in a bit torrent network. In some cases, the graph data structure by which the data is stored may be have edges defined by a distributed hash table, accessible via an associated lookup service by which such peers are identified in response to requests from client devices 14, for example, in Kademlia or Chord distributed hash tables.

In some embodiments, the untrusted data repository 12 is part of a larger data repository having portions that are trusted, or for which operators of client devices 14 are agnostic as to whether such portions are trusted, for instance, in portions of the data repository having public data. Public data may be data publicly accessible on the open Internet, or may be data of a less sensitive nature suitable for more traditional protection techniques used in conventional networks. In some cases, the untrusted data repository may be a portion of a larger business application, such as an enterprise resource planning application, or the like, and particularly sensitive data may be stored in the untrusted data repository 12.

In this example, the untrusted data repository 12 includes a node data store 18 (which may be distributed among RAM, persistent memory (like hard drives or solid state drives), or other storage mediums, of one or more computing devices), a controller 20 operative to coordinate the functionality of the repository 12 described herein, an application program interface server 22, a cache manager 24, and a consistency manager 26.

In some embodiments, the node data store 18 may include one or more of the graph data structures described below with reference to FIGS. 1B and 1C. In some embodiments, such graphs may include a plurality of graph nodes, each node having a unique identifier that is accessible to the untrusted data repository, such as a count of the number of nodes created to date at the time the respective node is created. Each node may also have an encrypted data collection that stores links between the nodes, also referred to as pointers from one node to another, or in some cases as edges of the corresponding graph, or records of the data stored in the data repository 12 by the client devices 14. In some cases, records of the data stored in the data repository 12 are distinct from metadata describing the arrangement of the corresponding graph, like the edges of the graph indicating which nodes point to which other nodes and which records are accessible via the nodes to which pointers are directed. In some cases, each edge may be associated with an indicator of which records are accessible via the edge, for instance, a range of records accessible by following a path including the edge.

In some embodiments, the untrusted data repository 12 can distinguish between the nodes (e.g., as separate objects in storage having different identifiers (e.g., in some cases, each node be a distinct file, like an encrypted container, having metadata, such as a node identifier)), but does not have access to the edges of the graph because those edges are stored in encrypted form. In some cases, the untrusted data repository 12 may also include a graph, or portions of the graph for which such edges are accessible to the untrusted data repository 12, which is not to imply that any characteristic attributed to any data structure herein must be possessed by each and every instance of the data structure in an embodiment. Thus, in some cases, the node data store 18 may store, from the perspective of the data repository 12, a plurality of units of data including a known identifier and an unknown payload, such units being, from the perspective of the data repository 12 otherwise unrelated. To expedite access to the nodes, in some embodiments, the node data store 18 may store the nodes in sequential order according to their node identifier, thereby facilitating relatively fast retrieval with techniques such as binary searches, or some embodiments may maintain an index of node identifiers and corresponding memory or (i.e., and/or) machine network addresses to facilitate retrieval relatively quickly. In some cases, such indices may be stored in memory of the controller 20 for fast retrieval.

In some embodiments, the controller 20 may be operative to receive requests for node identifiers from the API server 22, retrieve the corresponding node from the data store 18, and advance that node to the API server 22 to be sent to the requesting client device 14. In some cases, the controller 20 may be operative to verify whether the requested node is subject to an ongoing write operation by another client device 14 by querying a transaction log in memory of the consistency manager 26 and determining whether responsive transactions indicate an uncommitted write or ongoing write operation. In some embodiments, the controller 20 may block the read operation until the corresponding write operation is complete, or in some cases, the read operation may be permitted (e.g., followed by transmission of an updated version of the node).

In some embodiments, the controller 20 is also operative to receive requests for nodes to write to from client devices 14 via the API server 22, the request specifying a node identifier, and respond by retrieving the corresponding node from the node data store 18. In some embodiments, before advancing the node, a record in the consistency manager 26, such as in a transaction log, may be created to indicate that the node having the specified node identifier is undergoing a write operation, and the log may associate that record with a timestamp indicative of the current time. In some cases, the retrieved node subject to the write operation may be sent to the API server 22, which may send the node to the client device 14 executing the operation. In some cases, before sending the node, embodiments may interrogate a transaction log to ascertain whether another write operation on the node is ongoing and uncommitted, using the techniques described above, and the write operation may be blocked or delayed until the other write operation is complete. In some cases, after a client device writes to the node, the controller 20 may be further operative to receive the written node with the new data from the API server 22 and store the new node in the node data store 18. In some embodiments, the controller 20 may create an updated record in the transaction log maintained by the consistency manager 26 indicating the write is complete and committed.

Upon determining that a given node is being (or has been) written to, in some embodiments, the controller 20 may send an indication to the cache manager 24, which may cause the untrusted data repository 12 to send a message via API server 22 to client devices, indicating that the node undergoing the write operation should be expired from (e.g., deleted or labeled as unreliable) cache memory in the respective client devices 14.

In some embodiments, sending a node between the untrusted data repository 12 and the client devices 14 may include sending, or consist of sending, a portion of the data in a node, such as the node identifier, or equivalent thereof, and the encrypted data collection of a node. In some embodiments, nodes may include additional information that is not exchanged in an operation in which a node is sent, like a version of the node, a range of memory addresses in which the node is stored, and the like.

In some embodiments, the cache manager 24 may be operative to determine when data cached by client devices 14 has been changed in the untrusted data repository 12 and send messages to the client devices 14 indicating that the data in the cache is no longer current. In some cases, every time a given node is written to, the cache manager 24 may send a cache expiration message to every client device 14 with access to the node. The cache expiration message may include the node identifier and an indication that the node has changed. In other cases, to reduce overhead, the cache manager 24 may store in memory a list of client devices that have cached a given node (the client devices 14 providing this information via a message sent to API server 22 at the time of caching), the list including a plurality of client devices and one or more node identifiers associated with each of those client devices, those node identifiers indicating which nodes have data held in cache memory by the respective client devices 14. Upon receiving an indication that a given node has been written to, in some embodiments, the cache manager 24 may query this list for network addresses of client devices 14 having that node in cache memory and send a message, for instance via API server 22, to each responsive client device 14 address, such as an IP address, indicating that the corresponding cached data should be expired.

In some embodiments, the consistency manager 26 may maintain a transaction log. The log may include a plurality of transaction records, each record having a timestamp, an identifier of a client device (or account) requesting the transaction, a timestamp of the transaction (e.g., a timestamp of when the transaction began and when it was completed), a description of the transaction (e.g., a write transaction or a read transaction), and a node identifier to which the transaction pertains. For example, a record may indicate that a given node identifier underwent a write operation, requested at a given time from a given client device. Before receiving confirmation that the given node is subject to a complete write operation, the consistency manager 26 may store in the transaction log another record indicating that another client device 14 is attempting to write to the same node. In some embodiments, the consistency manager may query these records, detect temporally overlapping write operations, in which a write to a given node begins for one device, then begins for another client device, and then completes for one device, before completing for the other device, and resolve conflicts. In some embodiments, the write operations may yield two different copies of a given node, each copy having a different version identifier and the same node identifier, and the consistency manager 26 may choose between those versions to identify the authoritative version of the corresponding node. In some cases, the choice may be based on the transaction log, for example, the node version corresponding to the write request that was received first may be chosen, or the node version corresponding to the write completion that was received first may be chosen. In some embodiments, unchosen node versions may be deleted from the node data store 18, or in some embodiments, nodes may be immutable, and the most current version may be generally referenced, with prior versions referred to when transactions are rolled back (e.g., when the transaction log is distributed, and remote copies are reconciled to obtain eventual consistency). In some embodiments, a version index may be maintained for each node, with the version index indicating which version corresponds to the authoritative version as indicated by the consistency manager 26. Read and write requests may query this index to identify the node version upon which subsequent operations are to be performed.

In some embodiments, the client devices 14 may be configured to interface with the untrusted data store 12. The client devices 14 may include (e.g., execute code, stored in memory locally, and configured to provide) an encryption/decryption module 28, a cache module 30, query logic 32, and an application 34. In some embodiments, components 28, 30, and 32 may be modules (each module having some or all of the described functionality, and not necessarily being compiled in a single compilation instance) of a client application of a zero-knowledge database. In some cases, such a zero-knowledge database may include a server application hosted by the above-described components of the untrusted data repository 12, and collectively, the server and client may form a distributed zero-knowledge database application.

The term "zero-knowledge" should not be construed to imply that the untrusted data repository has zero-knowledge about information from client devices 14 in all senses. For example, in some cases, the untrusted data repository 12 may include public data, like that described above, and in some cases, the untrusted data repository 12 may be capable of observing which node identifiers are referenced by which client devices 14 in which sequence and with which frequency. Such information leakage, however, is expected to be relatively benign, compared to more traditional techniques for encrypting database applications on remote computing devices. And in some cases, dummy requests for nodes may obfuscate access frequencies and patterns. For example, client devices 14 may send queries to the untrusted data repository 12 that are not meant to retrieve any meaningful data (e.g., are not in response to queries), but rather to obfuscate the true access frequencies and patterns.

In some embodiments, the encryption/decryption module 28 may be operative to encrypt and decrypt the encrypted data collections of nodes stored in the node data store 18. Corresponding encryption keys may be stored in memory of the client device 14 or may be obtained by sending credentials (e.g., log-in credentials, or access keys) stored in memory of the client device 14 to a remote encryption key data store, which is not to imply that such remotely obtained encryption keys are not also at some point stored in memory of the client devices 14.

A variety of different types of encryption may be used. In some embodiments, the modules 28 encrypt data collections with private key encryption, with the private keys held in memory of the client devices 14, or otherwise being denied to the untrusted data repository 12 and not sent over Internet 16. In some cases, private key encryption may be used, as the untrusted data repository 12 is not intended to access the encrypted data. In some cases, probabilistic encryption may be used, to prevent another from matching nodes having identical data. Some embodiments may execute a key generation algorithm (e.g., one that selects two large random primes and combines those primes to generate the key), and associate the generated key with the corresponding node identifier, using a different key for each node, or for subsets of the nodes. Examples of encryption techniques include elliptic curve cryptography, the RSA algorithm, or XOR'ing the data with a random or pseudo random key (e.g., a key having as many characters as the data being encrypted). In some cases, random values may be obtained with the Digital Random Number Generator hardware feature offered in some processors made by Intel Corporation of Santa Clara, Calif.

In some embodiments, encrypted data may include padding added by the encryption/decryption module 28, so the encryption is more difficult to break with brute force attacks. In some embodiments, the padding may include random numbers (e.g., pseudorandom numbers, for instance, generated with a linear shift register, or by sampling the current wireless environment, by the client devices 14, such that writes of identical data with identical encryption keys yield a different encrypted collection of data, for instance, a bit sequence, encoding the data in encrypted format, with a different sequence of values, when received by the untrusted data repository 12, even if the encoded data is identical between bit sequences. The encryption keys accessible by a client device 14 may be inaccessible to the untrusted data repository 12. Consequently, the untrusted data repository 12 cannot decrypt data encrypted by the client device 14.

It should be noted, however, that additional layers of encryption may be used. For instance, public key encryption may be applied by the untrusted data repositories API server 22 before transmission on the Internet 16 (e.g., with TLS encryption), or the untrusted data repository 12 may apply additional layers of encryption using other keys accessible to the untrusted data repository 12. Decrypting these additional layers is distinct from decrypting the encryption applied by client devices 14 in the present context.

In some embodiments, the client devices may include a cache module 30, which may store previously read collections of data from the data store 18. In some embodiments, entire nodes may be stored by the cache 30, for instance, either in encrypted or decrypted form. In some embodiments, the cache 30 may store a node identifier in association with the corresponding data in the encrypted data collection of that respective node. In some embodiments, in response to determining that a given node is needed from the untrusted data repository 12 (e.g., to service a query), the client device 14 may first query cache memory 30 with the cache module 30 to determine whether the corresponding data collection is stored locally in cache memory. Upon determining that a node identifier corresponding to the needed node is present in cache memory of module 30, some embodiments may retrieve the corresponding data collection from cache memory of module 30 and the cache module 30 may provide that data collection to query logic 32, thereby reducing latency relative to obtaining this data from the untrusted data repository 12 over the Internet 16.

In some embodiments, the cache module 30 may receive a message from the cache manager 24, via the API server 22 and Internet 16, indicating that cache memory associated with a specified node identifier should be expired. In response, the cache module 30 may delete the records corresponding to the node identifier, or designate those records as expired.

A variety of techniques may be executed by the client device 14 to efficiently allocate a budget of cache memory. In some embodiments, nodes may be ranked according to the frequency with which they are retrieved from the untrusted data repository 12, and those nodes having a frequency ranking above a threshold number of nodes may be stored in cache memory. In some cases, the frequency may be calculated over a trailing duration, such as over a trailing minute, hour, day, week, or year. In some cases, two rankings may be used, one over a trailing longer duration, and one over a relatively short duration, with cache memory allocation divided between the two rankings (e.g., the top 10 nodes in each ranking).

In some embodiments, the client devices 14 may include a query logic module 32. The query logic module 32 may be operative to receive database queries (e.g., structured query language (SQL) commands) from application 34 and obtain answers to those queries from the untrusted data repository 12 or cache memory of module 30. In some cases, the query logic 32 may receive SQL queries and, in response, generate a plurality of requests for data to obtain information by which a query response may be formulated. For instance, a query from the application 34 may request a phone number associated with a given user identifier in a user identifier namespace of the application 34. In some cases, the received query may specify a table in a relational database model and a record in that table, with a record in the table being specified by the user identifier (e.g., "SELECT record_x FROM table_y"). In response, the query logic 32 may iterate through a sequence of nodes, traversing a path through the portion of a graph including those nodes, until the corresponding record is identified. Examples of this technique are described below with reference to FIGS. 1C and 1D. Similar techniques may be used for writing, with added logic to maintain a balanced allocation of data within the graph, for instance, by executing a process described below with reference to FIG. 1E. In some cases, query logic 32 may execute one or more processes to index data in the untrusted data repository 12. For instance, for frequently received queries, some embodiments may predictively generate an index mapping query parameters (before a query using those parameters is received) to node identifiers containing responsive data corresponding to respective query parameters. In some cases, the resulting index may be stored on client device 14, or in some embodiments, the resulting index may be stored in an encrypted portion of a node in the node data store 18, for instance, to facilitate sharing of the index by multiple client devices 14.

In some cases, responses to analytical queries (e.g., joins, sums, or other calculations based on multiple database records) may be precomputed by the query logic 32 to facilitate relatively fast responses to more complex queries. For instance, a regularly received (e.g., more frequently than a threshold, like more than 10 times a month) query may request the sum of expense account expenditures in a given month by each employee in a company, and the expenditures may be stored in encrypted data in the node data store 18. In some embodiments, to expedite such query responses, some embodiments may precompute (e.g., before a given instance of the query is received), for each record identifying an employee, the corresponding sum of expenditures for the preceding month, for instance, once each month, and the sums may be stored in calculated records in the encrypted data. A subsequent query for a total monthly expenditure by the given employee may then be serviced relatively promptly with reference to these records via an index of precomputed values formed in the precomputaton.

As noted above, the application 34 may be a variety of different types of applications, and in some cases, the application 34 may access both encrypted data in the untrusted data repository 12 and unencrypted data. In some cases, the application 34 may be distributed among multiple client devices, for instance, more than 100 client devices, more than 1000 client devices, or more than 10,000 client devices, within a computer system operated by an organization. For instance, in some cases, the application 34 may be an enterprise resource planning application, or the like, with client applications executing on client devices, and server applications executing on server devices, which in the context of the computing environment 10 may be referred to as client devices from the perspective of the untrusted data repository 12.

Figure 1B:
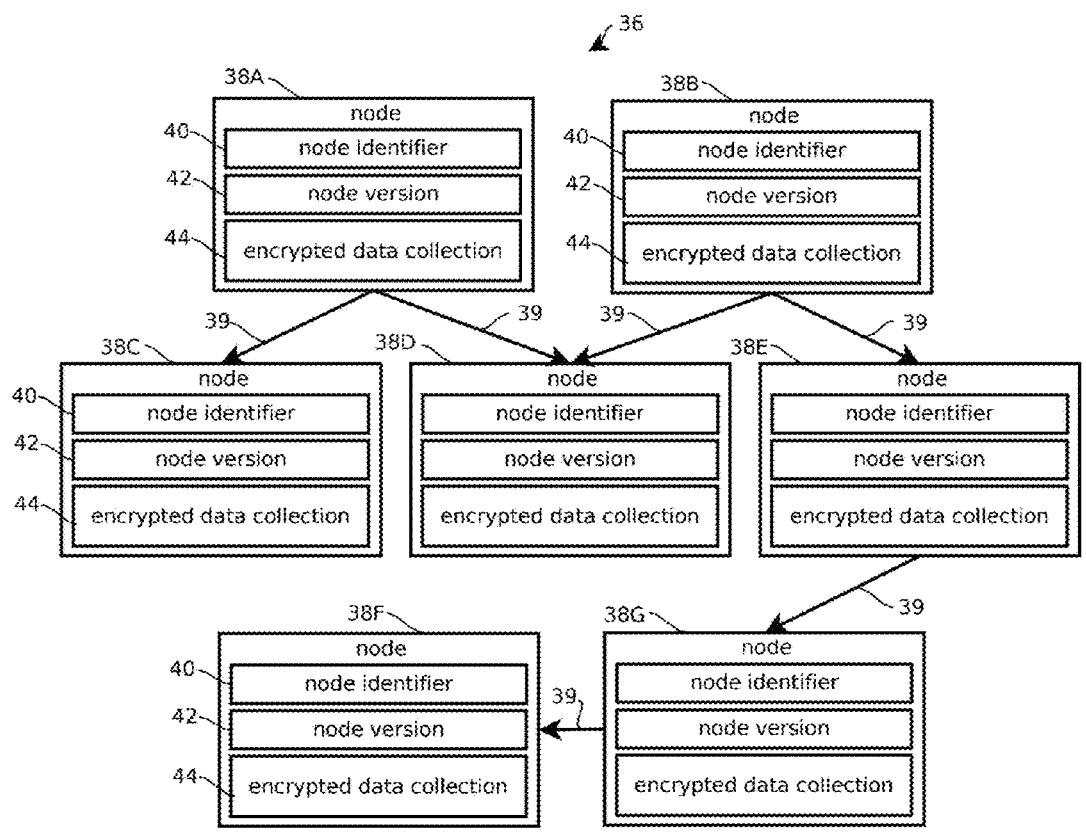
FIG. 1B depicts an example of a graph data structure by which subsets of data in the database system of FIG. 1A may be stored and accessed.

FIG. 1B shows an example of a graph of the above-mentioned nodes. The graph 36 of the illustrated example is an acyclic directed graph, with some of the nodes 38 including edges, or pointers 39 to other nodes 38. For instance, the illustrated node 38A includes an edge 39, also referred to as a pointer, to the nodes 38C and 38D. As noted above, each of the edges, or pointers may include the node identifier of the node to which the edge points, such as the node identifier of node 38C and node 38D for edges 39 from node 38A. In some cases, nodes may also store identifiers of nodes pointing to those nodes, which may be referenced when upstream nodes need to be updated (e.g., when a node is split into multiple nodes during a write operation). The edges, or pointers, may further include a description of the information accessible through the node to which the edge points. For instance, this description may include an upper and lower value of a range of database values (e.g., a range of database record key values) accessible in the graph 36 through a path that includes the downstream node 38. For instance, the pointer 39 between node 38A and 38C may indicate that node 38C includes a range of database records spanning from records for a user identifier 111 to a user identifier 756, and node 38C may include in the encrypted data collection records for at least some of these user accounts, for instance, a plurality of fields having values for each of the corresponding user accounts. For instance, user identifier 114 (as key value, and not as a reference to an item in the figures) may have a record with fields for the user identifier, a social security number, a first name, a last name, an address, an email address, and the like. Such values may be stored in association with each stored user account in node 38C in the range of user accounts 111 to 756. In some cases, records may be stored sparsely, for instance, with approximately every other user account number unoccupied or unassigned in the present example to leave room for additional writes in a desired sequence. In this example, these records encoding the user accounts may be stored in the encrypted data collection 44 of node 38C.

In another example, node 38B includes a pointer or edge 39 to node 38E, and node 38E may include in its encrypted data collection another edge 39 the node 38G. In some cases, some nodes 38 may include only edges to other nodes, and not include records stored by the database, or in some cases, the encrypted data collections may include both edges to other nodes and record stored by the database.

Each node 38 may include a node identifier 40, a node version 42, and an encrypted data collection 44. In some embodiments, the encrypted data collection may be an encrypted block of data encrypted by the encryption/decryption module 28 of a client device 14, with decryption keys to which the untrusted data store 12 does not have access. The node identifiers 40 may be unencrypted, and some node identifiers 40 may be referenced in the encrypted data collection 44 of other nodes, in some cases, thereby forming pointers or edges 39 to other nodes. Some embodiments may track and store node versions 42, which in some cases, may be changed or otherwise incremented each time a node is written to by client device, and these node versions may be referenced in records accessible to the consistency manager 26, such as a transaction log. Or in some embodiments, the node identifier may be created by calculating a hash value on the entries in the node, for instance an MD 5 hash or 5 HA 256 hash. In some cases, the hash value may be calculated based on the encrypted form of the entries.

A variety of different graphs 36 may be used, with various trade-offs between programming complexity, access speeds, and database capacities. In some cases, the graph 36 may be a hierarchical arrangement of nodes, such as a tree, like a binary tree or, more generally, a B-tree. In some embodiments, the tree may be approximately or fully balanced. In some cases, the graph 36 may be a plurality of trees (e.g., a forest data structure). In some cases, the graph may include other structures, such as a skip list to favor concurrent access.

Figure 1C:
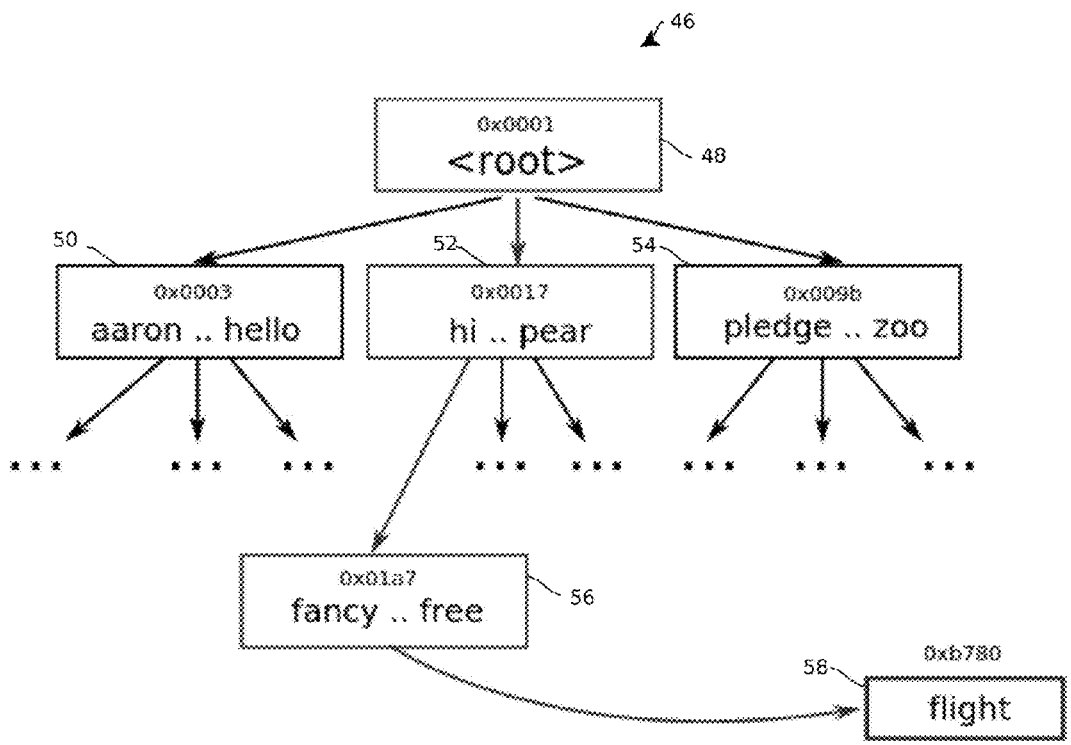
FIG. 1C depicts an example of a B-tree, which is an example of a structure by which data may be stored in a database.

FIG. 1C shows an example of a graph 46 in the form of a B-tree. B-tree graphs are expected to be relatively robust to large data sets, while providing relatively fast access to individual records in the data set. In some embodiments, the graph 46 includes a root node 48. The nodes of the graph 46 may include the format and information of the nodes described above. In the illustrated example, the root node 48 has a node identifier of 0X0001. An encrypted data collection of the root node 48 may include references to node identifiers of nodes 50, 52, and 54, having node identifiers 0X0003, 0X0017, and 0X009b, respectively. In some cases, the encrypted data collection of each non-leaf node includes a description of the range of values accessible through a path including the referenced node. For instance, the encrypted data collection of the root node 48 may include an indication that the range of values from "aaron" to "hello" (e.g., with the values arranged alphabetically in sequence, like in a keyword index indicating which documents include the keywords) is accessible through the node having the node identifier 0X003. Similarly, the encrypted data collection of the root node 48 may further include an identifier of the node 52 (i.e. 0X0017), in association with the range of values accessible in a path including that node (i.e., terms between the word "hi" and the term "pear").

In some cases, nodes may include pointers to other nodes, which contain pointers to other nodes, each pointer including a description of the range of values accessible on a path including respective node, until a leaf node is reached. In the illustrated example, leaf node 56 includes records in the range between the term "fancy" and the term "free." In some embodiments, a leaf node 58 may include a single record, in this case, the record having a key value of term "flight," like a list of documents including this term and word counts in those documents where the term occurs. In some embodiments, the encrypted data collection may include pointers to other nodes and associated key values that indicate the highest value or lowest value to be stored in that other node, with a parent node, and adjacent key values implicitly indicating the range of values to be identified in a given node, thereby potentially conserving memory by listing one end of a range in association with each pointer. Examples of a read and write operation consistent with the data structure of 1C are described below.

In some embodiments, the B-tree 46 may be maintained to comply with, or approximately comply with, a number of rules, such as rules for constructing and interrogating a B-tree data structure. For instance, in some embodiments, every node may have at most a threshold amount of children nodes pointed to by that node (or be split into two nodes if the threshold is exceeded). In some embodiments, every non-leaf node, other than a root node, may have at least a fraction of that threshold amount of children, such as at least one half (or be merged with another node if the fraction drops below the threshold). In some embodiments, a root node may have at least two children nodes, unless that root node is a leaf node. In some cases, a non-leaf node with X number of children nodes to which that non-leaf node points, may contain X−1 keys, or indicators (e.g., max or min values) of ranges stored by the respective children nodes, for instance, with each key indicating a dividing point between ranges addressable through the respective children nodes. In some embodiments, all leaf nodes may appear on the same level. In some cases, nodes at a lowest level of the tree 46 may be referred to as leaf nodes, and a node at a highest level may be referred to as a root node. Nodes between the leaf nodes and the root nodes may be referred to as intermediate nodes or branching nodes. In some cases, leaf nodes may include records stored by the database, while non-leaf nodes may include pointers to other children nodes, in some cases exclusively, or in some cases, pointers and database records may be mixed in a given node. For instance, in some embodiments, leaf nodes may include pointers of adjacent leaf nodes, having adjacent ranges of values, to expedite sequential access to records in a plurality of leaf nodes.

Figure 1D:
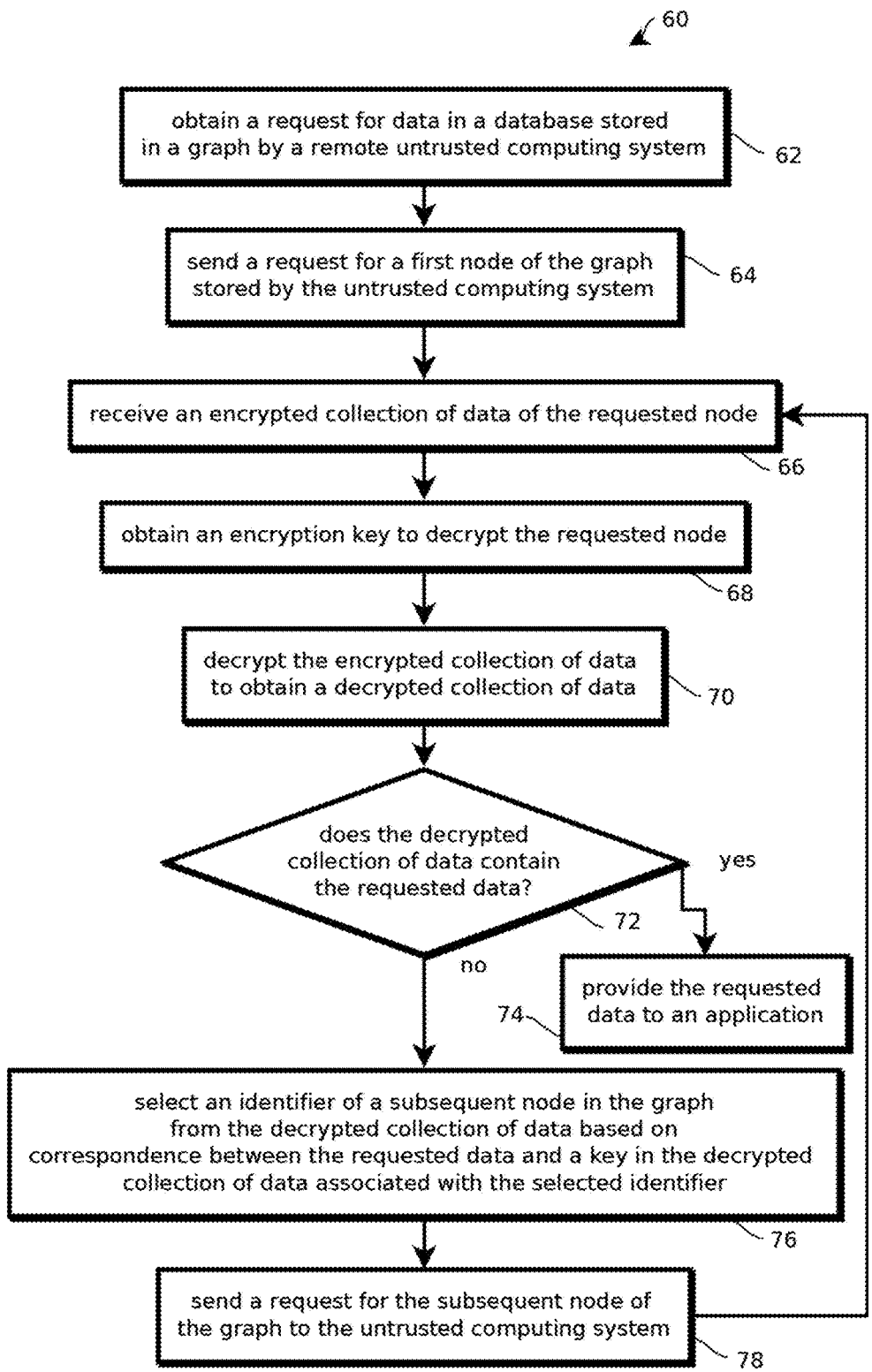
FIG. 1D is a flow chart depicting an example of a process to retrieve data from a remote zero-knowledge database.

FIG. 1D shows an example of a process 60 for reading data from a remotely stored zero-knowledge database, such as in the untrusted data repository 12 described above. It should be noted that zero-knowledge databases include databases in which a portion of the database is zero-knowledge and another portion of the database is, for example, public data. In some embodiments, the process 60 may be performed by the above-described client devices 14. But embodiments of the process 60, like the other processes described herein, are not limited to the particular implementations described above.

In some embodiments, the process 60 includes obtaining a request for data in a database stored in a graph by a remote untrusted computing system, as indicated by block 62. In some cases, the request for data may be a request from the application 34 mentioned above, or the request for data may be generated by translating a SQL query from the application into one or more of a plurality of requests for data to service that query, for instance, by the above-described query logic 32. In some cases, the request may be for data encoded in records of a zero-knowledge database, for instance, in encrypted data collections of the above-described nodes in a graph. In some cases, the requested data and edges between nodes in the graph may be solely stored in encrypted data collections for which the untrusted data repository does not have access to decryption keys.

Next, some embodiments may send a request for a first node of the graph stored by the untrusted computing system, as indicated by block 64. Sending the request may include sending an application program interface request to the API server 22 by transmitting an API request to a local area network that is connected to the Internet 16 described above. In some cases, the request may identify account credentials of the client device, a session with a remote untrusted computing system, and a node identifier, for example, a node identifier of a root node of a B-tree 46. In some cases, the request for a first node may be a request for a non-root node of a tree. For example, a copy of the root node may be stored in cache memory of the client, and some embodiments may identify lower level node identifiers in a path to which the requested data is accessible. Or in some cases, the graph is a non-tree graph, for example, some other acyclic directed graph. In some cases, the graph nodes are identified according to a distributed hash table, and the requested node resides at an address accessed through one or more hops through other computing devices participating in a distributed hash table-based network, like in a bit torrent network.

In some cases, the sent request may be received by the untrusted computing system, for instance, by the API server 22, and the corresponding node may be retrieved from a node data store 18 and sent back to the requesting computing device via the Internet 16. In some cases, the requested node may be sent without decrypting an encrypted data collection of the requested node. In some embodiments, the first node may be a non-leaf node including an index in its encrypted data collection, the index mapping node pointers (e.g., graph edges expressed, in part, as other node identifiers) to ranges of database records accessible in the path through the graph including those respective nodes (e.g., through that node, and through one or more layers of a hierarchy of nodes accessible through that node).

Next, some embodiments may receive an encrypted collection of data of the requested node, as indicated by block 66. In some embodiments, an entire node may be received, or receiving a node may entail just receiving the encrypted data collection and, in some cases, a corresponding node identifier. In some cases, the encrypted data collection may be a monolithic block of data when in encrypted form, for example, a file, such as a zip or tar file that has been encrypted. In some cases, the encrypted data collections may be compressed by the encryption/decryption module 28 of client device 14 before encryption and decompressed by the encryption/decryption module 28 after decryption. Compressing the data is expected to conserve bandwidth over the Internet 16 and conserve storage space in the untrusted data repository 12. Compressing the data before encryption is expected to facilitate more efficient compression, providing for the use of techniques, such as run length coding that would be interfered with if applied subsequent to encryption, or some embodiments may compress after encryption.

Next, some embodiments may obtain an encryption key to decrypt the requested node, as indicated by block 68. In some cases, encryption keys may be stored locally on the client device 14, or in some embodiments, those keys may be retrieved from a remote client device, for instance, within the same computing system, like from one of a collection of networked computers on a secure network.

In some embodiments, a client device may be tasked with periodically changing encryption keys and distributing those changed encryption keys to other client devices in a computing system to protect against cases in which an encryption key is inadvertently disclosed, for instance, in a data breach, by one of the client devices in the computing system. For instance, such a computing device may run an application that crawls recursively through a graph of nodes and decrypts the encrypted data collections of those nodes with a first, older key, and then reencrypts those data collections with a different, new encryption key, before sending the reencrypted nodes back to the untrusted data repository 12 for storage. The new encryption keys may be distributed to client devices 14 within the same computing system by this application for subsequent queries to the untrusted data repository 12. Or in some cases, one client device in a computing system may act as an intermediary, performing encryption and decryption on nodes requested by another client device in the same computing system, thereby limiting the number of client devices in a computing system having access to encryption keys. Another way to replace an old key with a new one (key rotation) would be to use proxy reencryption. Proxy reencryption was originally designed to allow an untrusted computing device to transform data encrypted for one party (A) so that it is subsequently encrypted for another party (B) using a transformation key produced by A. To make a use of it for key rotation, some embodiments may let the old key be key A and the new key be key B. Client A may produce a transformation key based on information about key A and key B and hand it to the server which, in turn, may perform the reencryption transformation, after which data appears to be encrypted with key B. In this case, the client may make use of the computational power of the server for performing key rotation without exposing keys to the server. In some cases, the computing system with these client devices may be a computing system having a secure network, for instance, behind the same firewall, connecting these two client devices.

Some embodiments may include decrypting the encrypted collection of data to obtain a decrypted collection of data, as indicated by block 70. Decryption may be performed with the encryption key obtained in step 68. In some embodiments, multiple encryption keys may be obtained, for instance to process multiple layers of encryption.

Next, some embodiments may determine whether the decrypted collection of data contains the requested data, as indicated by block 72. In some embodiments, database records may reside in leaf nodes of a tree, and higher-level nodes may be populated with pointers to lower-level nodes, but no database records. In such embodiments, the determination of step 72 may be performed by determining that the requested node is a non-leaf node. In other examples, some embodiments may include both pointers to other nodes and database records, in which case some embodiments may compare the database records to search parameters (e.g., a key value of a sought record, or a criterion for selecting records) to determine whether the database records include the requested data.

Determining whether the requested data is present in data records may include iterating through each of the records, determining whether a key value matches a key value specified in the request for data, for instance, whether a user identifier specified in a request matches a user identifier in a data record. In some embodiments, records may be stored as hierarchical objects, for example in serializes format as JavaScript™ object notation (JSON) or extensible markup language (XML), and some embodiments may determine whether values in those records match a value specified by the request for data. In some embodiments, the database records may be stored in a sorted order, for instance, in a sorted ordered list, for example, ordered by key values of the records, to facilitate relatively fast searching with a binary search of the records in the decrypted collection of data.

Upon determining that the decrypted collection of data does contain the requested data, some embodiments may provide the requested data to an application, as indicated by block 74, such as an application that initiated the request for data in step 62. Providing the requested data may include translating the data into a format corresponding to a structured query language response, or in some cases, the data may be provided in a hierarchical serialized format, for instance, as a XML or JSON output. In some cases, providing the requested data to an application may include transmitting the requested data to another computing device in a computing system, or in some cases, the requested data may be requested by, and provided to, an application executing on the same computing device.

Alternatively, upon determining that the decrypted collection of data does not contain the requested data, some embodiments may proceed to block 76. In this step, some embodiments select an identifier of a subsequent node in the graph from the decrypted collection of data based on correspondence between the requested data and a key in the decrypted collection of data associated with the selected identifier. In some cases, the decrypted collection of data contains an index mapping ranges of database records, like ranges of keys values for such records, to identifiers of nodes through which those ranges of database records are accessible, for instance, pointers to child nodes, such as child nodes that contain pointers to leaf nodes in which the requested data resides (or would reside if records are present, as in some cases, the request for data may yield a null response, indicating that such a record does not exist in the expected location). In some embodiments, selecting an identifier may include searching a list of key values to identify the corresponding node identifier. In some embodiments, the key values may be stored in a sorted order to facilitate relatively fast retrieval, for instance with the binary search.

Next, some embodiments may send a request for the subsequent node of the graph to the untrusted computing system, as indicated by block 78. In some cases, the request may be sent to a different computing device (e.g., when navigating through a collection of computing devices according to records in a distributed hash table, with each of the computing devices having a portion of the graph, (e.g., one node)). Sending the request for the subsequent node may entail the steps described above with reference to block 64, with a different node identifier that is closer in the graph to the requested data than the first node of the graph. In some embodiments, sending the request for the subsequent node may include determining whether cache memory stores a cached version of the subsequent node on the computing device performing process 60. Upon determining that cache memory contains the subsequent node, some embodiments may proceed to step 72, if and only if the cache memory stores the node in decrypted format, or to step 68, if cache memory stores the subsequent node in encrypted format. After sending the request, embodiments may proceed to step 66, repeating step 66, 68, 70, 72 and so on for the subsequent node, in some cases, looping through these steps multiple times, as the process 60 navigates through a path through the graph, for instance, by recursively crawling from a root node to a leaf node either having the requested data, or being the leaf node at which the requested data would be present but is not, in which case a null response may be returned, which may constitute the requested data for the present purposes if the requested data is not present in the database.

Figure 1E:
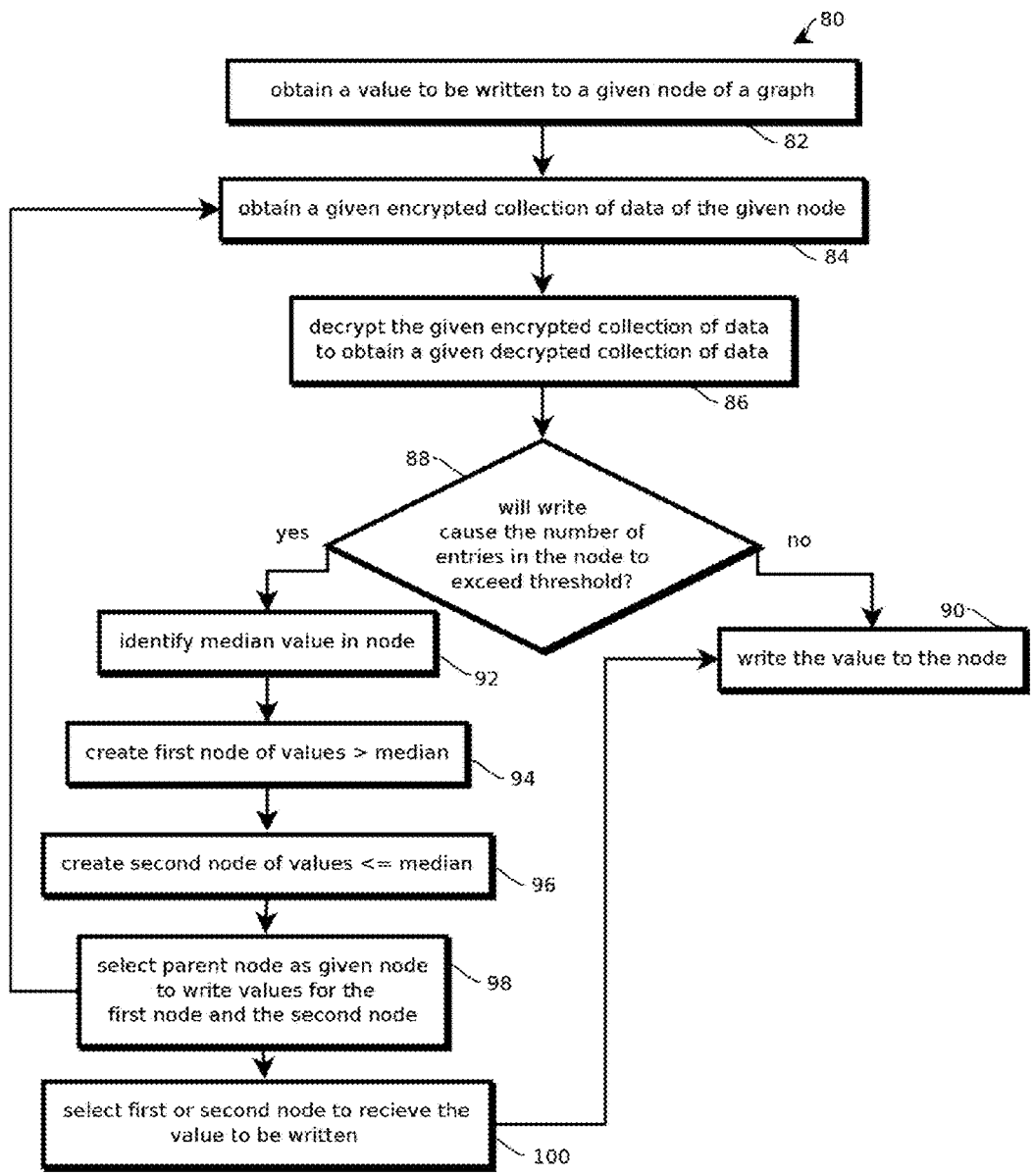
FIG. 1E is a flow chart depicting an example of a process to write data to a remote zero-knowledge database.

FIG. 1E shows an example of process 80 for writing data to a balanced tree, such as a B-tree graph encoding a zero-knowledge database. Balancing trees is expected to yield relatively fast retrieval of data, as a number of levels of hierarchy of the tree may be kept relatively low in worst-case scenarios, thereby providing for relatively few requests and responses to navigate from a root node to a leaf node. In some embodiments, the steps of process 80 may be performed by one of the above-described client devices 14.

Process 80 may begin with obtaining a value to be written to a given node of a graph, as indicated by block 82. In some cases, the graph may be the graph described above, stored in the node data store 18 of the untrusted data repository 12. In some cases, obtaining a value to be written may include receiving a structured query language request to write a value to a database record and transmitting that request into a sequence of API request API server 22 to effectuate the write operation. In another example, obtaining a value may include performing the process 60 to read data; executing an analytical query, such as calculating a sum of values, or constructing a join of values; and writing a result as the value to be written. In some cases, the value to be written may be obtained by one of the above-described applications, such as application 34. In some cases, application 34 may reside on a different client device in a computing system from a client device having the other components 28, 30, and 32, for instance, on client devices in a computing system connecting the client devices in a secure portion of a network.

Next, some embodiments may obtain a given encrypted collection of data of the given node, as indicated by block 84. Obtaining the given encrypted collection of data may include executing the process 60 to navigate to a leaf node in which the value to be written is to reside, for instance, as indicated by ranges of values associated with the node identifier of the leaf node. In some cases, step 84 may include sending an indication to the untrusted data repository 12 that a client device 14 is undertaking a write operation on the given node, and the untrusted data repository may advance this message to the consistency manager 26, which may add a record to a transaction log. Or in some cases, consistency manager 26 may lock the given node (e.g., with a spinlock) to prevent other client devices from writing to the given node until the write operation is complete and committed. Next, some embodiments may decrypt the given encrypted collection of data to obtain a given decrypted collection of data, as indicated by block 86. Block 86 may entail steps like those described above with reference to block 68 and 70 of process 60 of FIG. 1D.

Next, some embodiments may determine whether the write will cause the number of entries in the node to exceed a threshold, as indicated by block 88. Entries may be either key values mapped to pointers to other node identifiers, or entries may be database records, for instance, in leaf nodes. In some cases, the same threshold may be used both for key values mapped to pointers and to database records, or some embodiments may use different thresholds for these different categories of entries. In some embodiments, each node may include a count of the number of entries. In some of those embodiments, each time a value is written to the node, that count may be incremented, and each time a value is deleted from the node, that count may be decremented. Or in some cases, the entries may be counted each time step 88 is performed. Upon determining that the write will not cause the number of entries in the node to exceed the threshold, some embodiments may proceed to step 90.

In step 90, some embodiments may write the value to the node. Writing the value to the node may include inserting the value in an ordered list of entries in the node and incrementing a counter of entries in the node, for instance, a counter stored in the encrypted collection of data. In some embodiments, writing the value to the node may include writing an updated version of the node to cache memory of the client device. In some embodiments, writing the value to the node may include sending an updated version of the node to the untrusted data repository 12 to be stored in the node data store 18. In some embodiments, this write operation may include encrypting an updated version of the collection of data for the node with the client device and, then, sending the encrypted collection of data of the node, along with an identifier of the node to the untrusted data repository 12 for storage as an updated version in the node data store 18. Upon storing the updated version, some embodiments may assign the node a new version identifier, for instance, with the consistency manager 26. Some embodiments of the consistency manager 26 may update a transaction log, and in some cases, determine whether inconsistent write operations were undertaken, for instance, by two client devices 14 attempting to write to the same node, in which case, some embodiments of the consistency manager 26 may rollback one of the write operations, for instance, by designating a version of the node as non-authoritative or deleting that version of the node. In some embodiments, updated versions of nodes may overwrite earlier versions, or in some embodiments, nodes may be immutable, with different versions residing in the untrusted repository.

Upon determining that the write will cause a number of entries in the node to exceed the threshold, some embodiments may proceed to step 92 and identify a median value in the node. In some embodiments, the median value may be a median value of the entries in the node, such as a median value of key values mapped to pointers, or a median value of database records in the node. The median value may be used to split the entries in the node to create two nodes, each one with half of the entries in the node. In other embodiments, the node may be split into more than two nodes, for example, three or four or more. Next, some embodiments may create a first node of values that are greater than the median value, as indicated by block 94. Creating the first node may entail removing values less than the median or equal to the median from the given node, with the given node serving as the first node for purposes of block 94.

Next, some embodiments may create a second node of values from the given node that are less than or equal to the median, as indicated by block 96. Creating the second node may entail adding the values (i.e., entries having those values), to the data collection of the second node to create the second node, such as the values of the given node not present in the first node after step 94. In some cases, creating the second node may include creating a node identifier of the second node. In some cases, the identifier may be a count of nodes in the graph, and the untrusted data repository may send a current count (reflecting both completed writes and other concurrent writes) in response to a request for such a count when a client device determines to split a node.

Next, some embodiments may select a parent node as the given node for purposes of step 84 to write pointer values for the first node and the second node, as indicated by block 98. In some cases, the entries in the parent node may be updated, for instance, with key values mapping the first node to the values greater than the median, and the second node to values less than or equal to the median. In some cases, the portion of process 80 from step 84 to step 98 may repeat recursively up a tree, splitting parent nodes to balance the tree until a root node is reached, in which case a root node may be split and a new root node created above the former root node.

The process 80 further includes determining whether the value is to be written in the first or second node as indicated by steps 100 and 90. Writing this value may include inserting the value in an ordered list of values, and then re-encrypting the data collection of the node, before sending the encrypted data collection back to the untrusted data repository for storage.

Thus, in some embodiments, a client-server architecture is provided. Query and encryption logic may be pushed client-side. Since the server has no insight in these examples into the nature of the data, the risk of data breach is much lower. Even if an attacker successfully infiltrates the server, she will not have access to the unencrypted data or even any insight into its structure. By splicing the database index into pieces which are encrypted and stored on the server, some embodiments are able to provide end-to-end encryption. The methodology can include multiple users with many parallel requests.

Further, as explained, data may be structured as B-trees or other types of graphs. A B-tree, in this example, may include buckets, each of which can be either a root, branch, or leaf node. The leaf nodes of a tree point to the actual objects being stored. In some embodiments, searching the database is a tree traversal.

As discussed above, in order to make the database secure but still capable of performing search functions, the client may encrypt the buckets at the time of creation or modification. The server, which in some embodiments, stores the buckets, never knows this encryption key (which is not to imply that the server may not apply additional layers of encryption to otherwise encrypted files). The objects referenced by the leaf nodes of the B-tree indexes may be encrypted with the same or other encryption key.

In some embodiments, the server does not know how individual objects are organized within a tree structure (or other linked data structure, such as an acyclic graph), or whether they even belong to a tree structure at all. In some embodiments, the server cannot compare objects, or even tell whether they are the same object.

Figure 2:
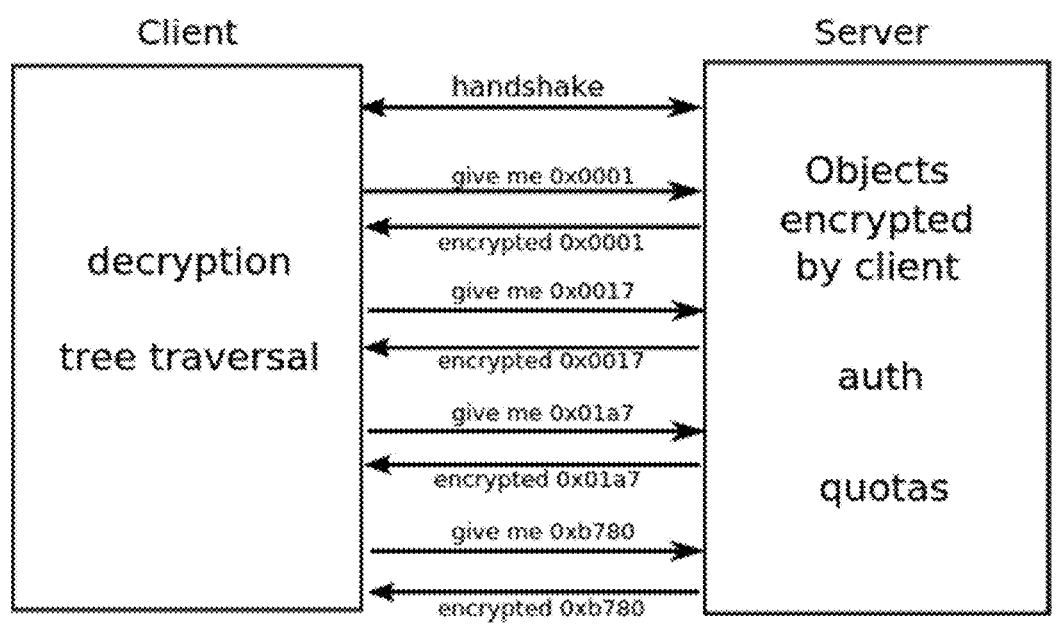
FIG. 2 is a block diagram depicting an example protocol specification, starting with the initial handshake between client and server, followed by the multiple requests/responses that are performed as the client traverses a B-tree when making a query, in some embodiments.

When a client performs a query, in some cases, it asks the server to return buckets of the tree as it traverses it (e.g., in a just-in-time fashion). FIG. 2 shows a sequence of client requests for traversal of the tree from FIG. 1C.

Figure 3:
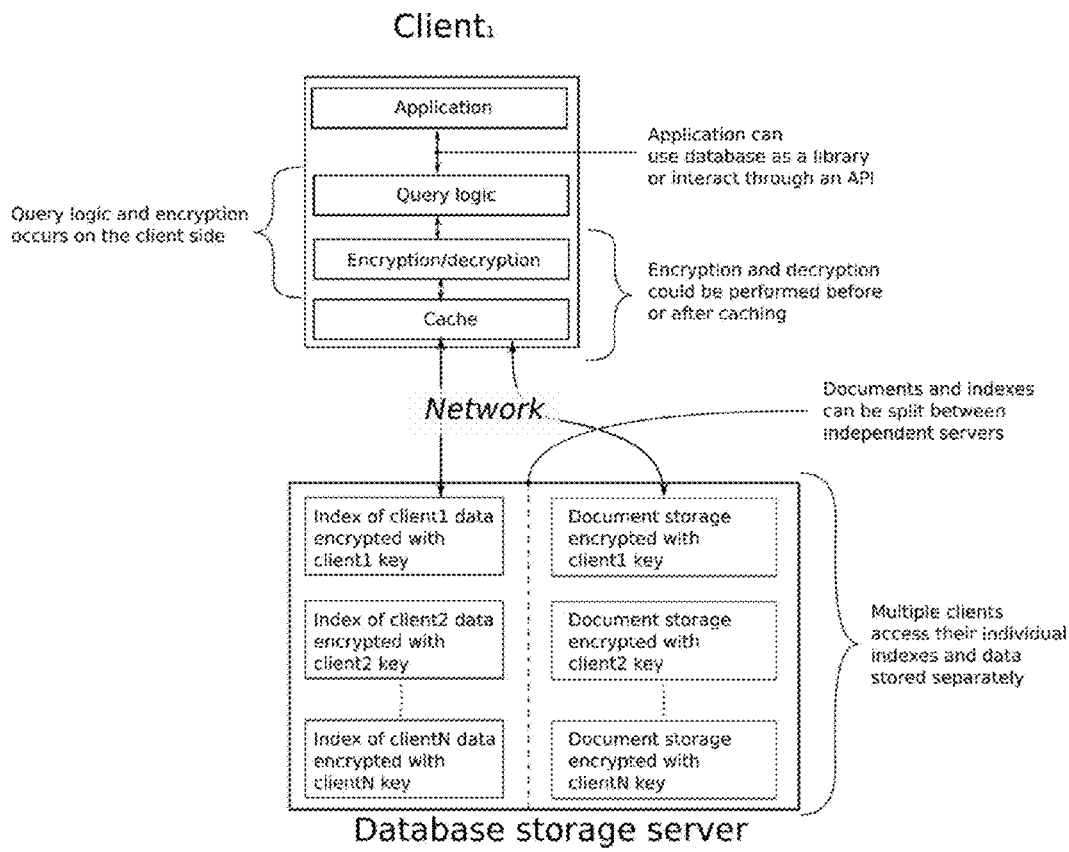
FIG. 3 depicts an example architecture wherein each client has a unique private tree.
Figure 4:
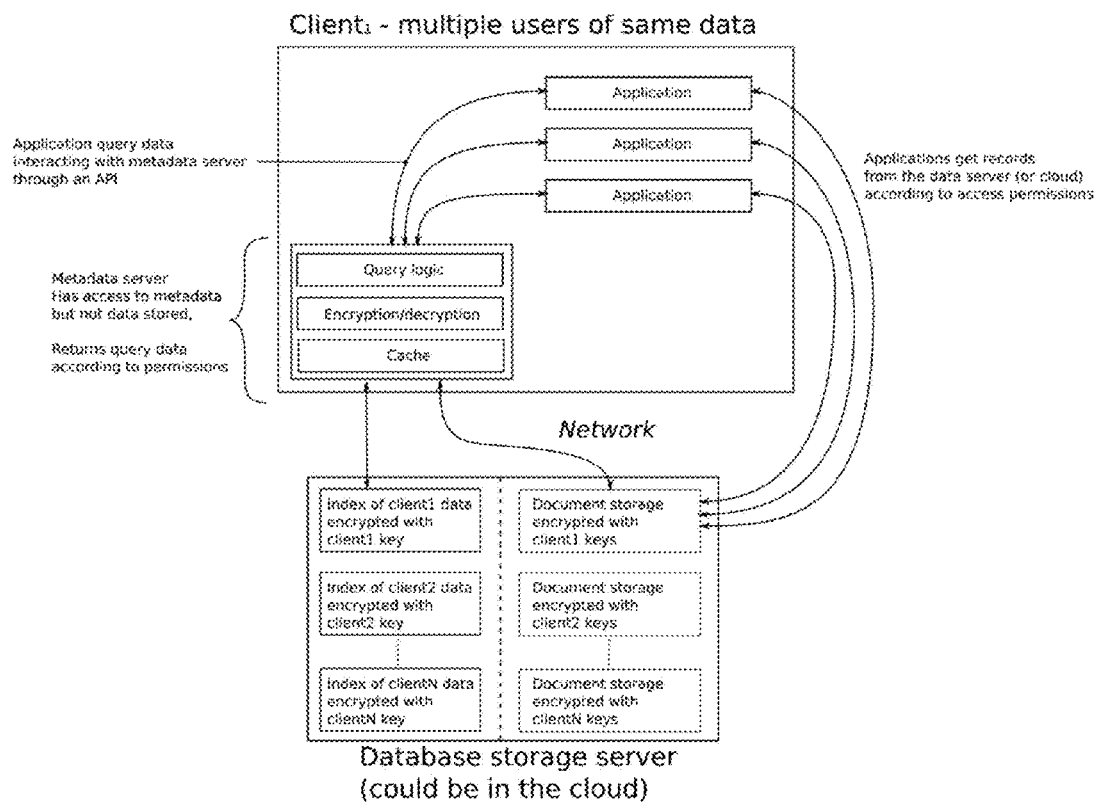
FIG. 4 depicts an example architecture wherein clients share trees by which clients may query the database server via an intermediary (metadata) server which filters results according to individual client permissions or by which clients can download objects from the storage server, bypassing metadata server.

In some embodiments, the server can provide objects (trees and the stored data) to multiple clients simultaneously, each of whom may access his own private data set and private index (FIG. 3) or a shared data set (FIG. 4). In the latter case, the server can, in some embodiments, set quotas or throttle data in case one of the clients is compromised. For example, if an unauthorized user or attacker gains access to a client and attempts to download the entire database, this would be disallowed once the amount of data downloaded surpasses some quota. Variations on the system architecture can be implemented to meet the specific needs and usage patterns of various organizations:

Example 1—Clients access their private datasets and indexes individually; and

Example 2—In some embodiments, clients access a Cloud Access Security Broker (CASB), which is located within the organization. The CASB server may access a storage server in the cloud or other remote location, which does not have to be trusted.

Example 1 is expected to be particularly relevant for consumer applications. In some embodiments, each consumer owns his data and encryption keys. Therefore, an attacker would need to obtain keys of all the consumers to compromise all the data, which is expected to be impractical.

Example 2 is more relevant to enterprises, which want to take advantage of cloud services, rather than storing everything on their own servers. This approach may support different kinds of security models within organizations (see e.g., FIGS. 4-7). It also facilitates the implementation of drop-in replacements for existing SQL and NoSQL database systems such as Oracle™, PostgreSQL™, MySQL™, MongoDB™, etc. In fact, the original database engine of such database systems can be used to construct query logic by the CASB.

Both approaches can be combined with storing public data on the remote server, or with existing server-side algorithms to allow querying of encrypted data while opening some metadata properties to a possible adversary, such as with CryptDB, or MONOMI. In some embodiments, the balance of these hybrid combinations of remote index access and server-side algorithms can be determined based on user requirements.

Example 1 is demonstrated by FIG. 3. In this approach, each client has his own private documents and private indexes, encrypted with the client's key. In some embodiments, query logic is executed on the client-side. Additionally, the client may be responsible for data or index encryption as well as decryption and compression. Optional (which is not to imply that other features are not optional) caching of frequently accessed B-tree buckets can be done for either encrypted and compressed data, or decrypted and uncompressed data (or encrypted and uncompressed data, or decrypted and compressed data). In the first case, the client is more secure when its data is at rest and, in the second case, the client is not required to have as much central processing unit (CPU) power. Adding new data to the database and updating data and indexes is also done from the client, in some use cases.

In some embodiments, the application can interact with the above-described logic by importing it as a library or via an API.

In some embodiments, the server contains data and indexes of multiple clients. When a client updates his data or records new data, other instances of the application being run by the same client may be present (i.e., if the database is being accessed from several locations or devices). Therefore, in some embodiments, the server may send invalidation messages for updated records or index buckets in order to ensure that all instances of a client's application have the most recent data in their caching layer.

Approach 2 is illustrated by FIGS. 4-7. In this approach, multiple client applications may interact with the server through a CASB. This can be done in order to handle multiple concurrent write queries to the same index (FIG. 5), manage data access permissions for shared indexes (FIGS. 6 and 7), and/or provide a compatibility layer to support existing applications which use currently widespread databases (like SQL or NoSQL varieties).

FIG. 4 illustrates a situation where a CASB manages access permissions within an organization which uses the database. In some embodiments, the CASB can access encrypted indexes on the server and knows encryption/decryption keys for the indexes. The CASB does not necessarily have to be able to access and decrypt data records—simply accessing the index information may be sufficient in some use cases.

In some embodiments, applications within an organization can perform queries through the CASB and fetch matching records either directly from the server (which may manage access permissions via the CASB) or from the CASB itself. In this scenario, the CASB is also a good place to install adapters for existing databases systems.

In some embodiments, CASBs can also manage multiple simultaneous write queries to the database. The CASB may be responsible for conflict resolution of different records and/or indexes written by clients to the database.

Figure 5:
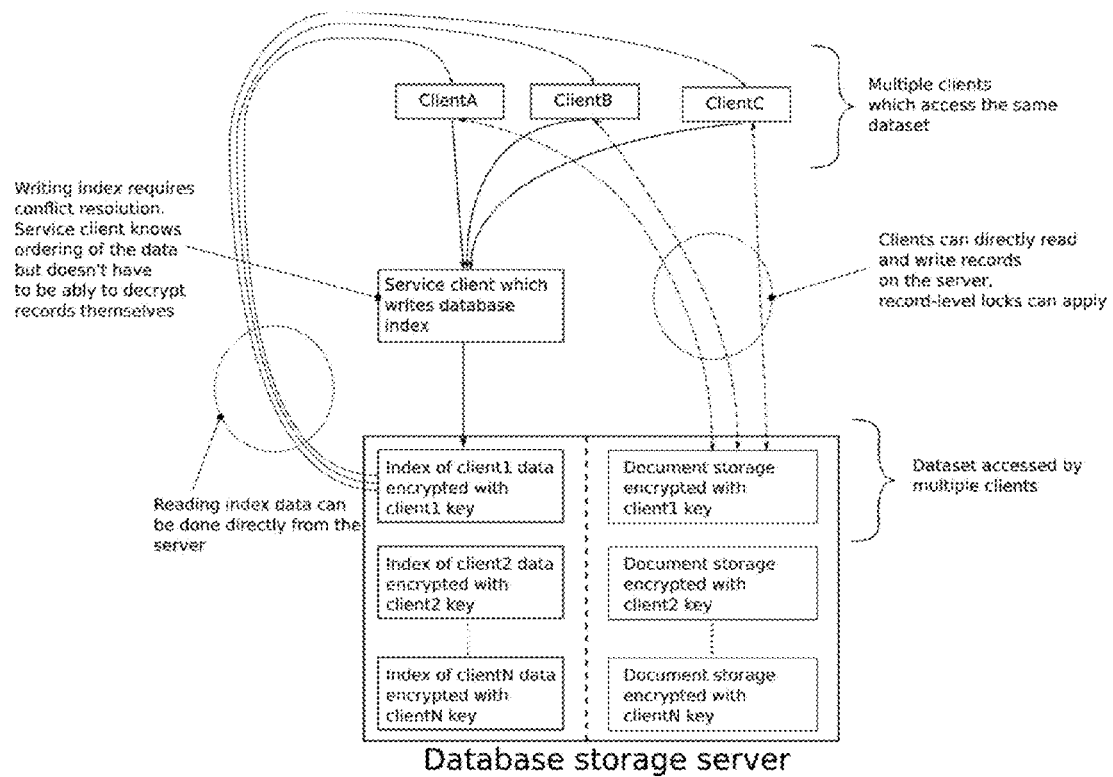
FIG. 5 depicts a use case in which multiple clients access the same data, and a writing client is used to make the architecture performant, and in some embodiments, clients access the database server directly for all requests other than writes.
Figure 6:
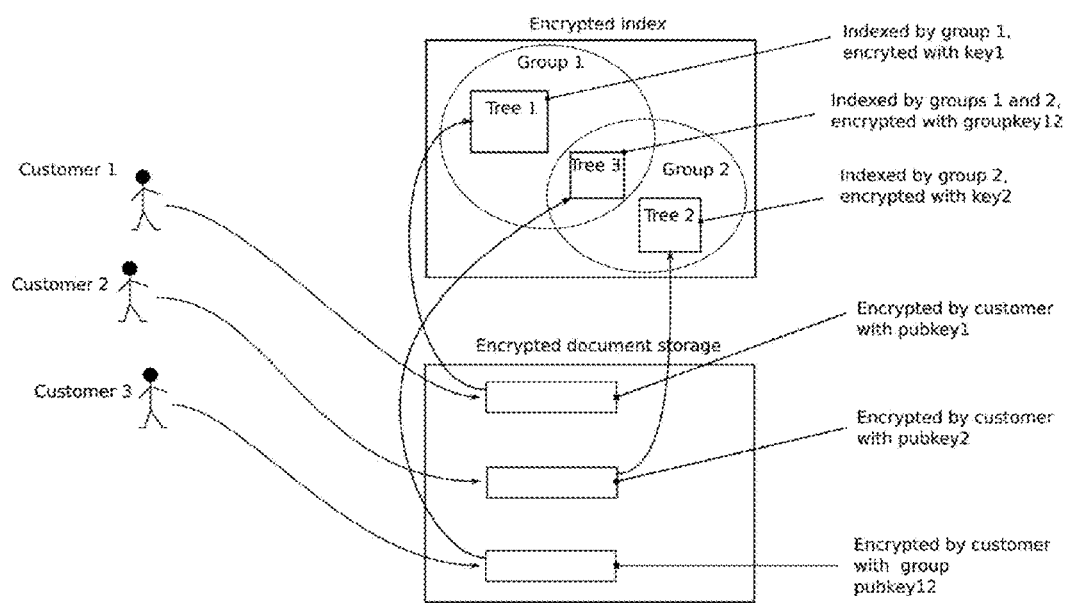
FIG. 6 depicts a use case in which customers hand their data to the database, pre-encrypted for groups of database users allowed to handle the data and these groups may have individual B-trees for indexing data of customers they are allowed to access, or in some embodiments, once customer data is recorded into the database, corresponding groups of database users update their indexes in the background.
Figure 7:
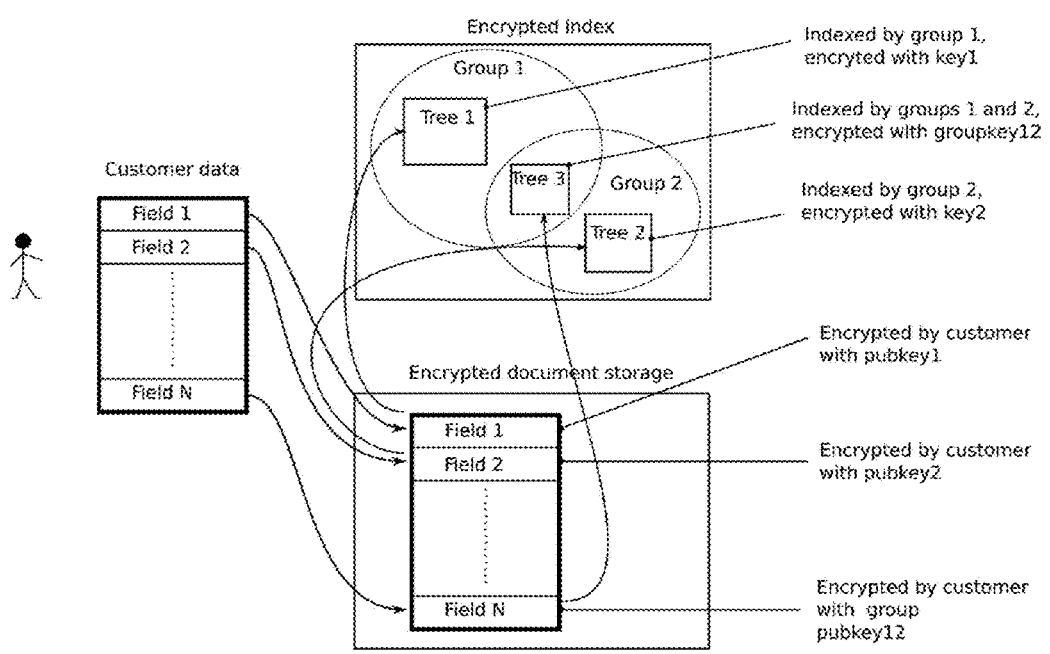
FIG. 7 depicts a use case in which customers hand different fields in their records to different groups of database users and, in some cases, use field-level encryption, wherein the fields are indexed by database users when they are allowed to access the fields.

In some embodiments, managing multiple simultaneous queries can be done separately from access permissions. FIG. 5 shows multiple client apps having direct access to the same data and indexes on the remote server which takes load off the CASB. Here, in this example, the CASB participates when and only when a client device has to write data. If desired, the CASB can be limited to accessing only indexes.

In some embodiments, access permissions can also be managed without a CASB. In this case, groups within an organization may have their data encrypted with their encryption keys or group encryption keys. In this example, each group has its own private subtree. Alternatively, groups can share subtrees on data which they both have permission to access (see e.g., FIGS. 6 and 7).

Some embodiments may use multiple client requests to perform one query. Due to the latency between client and server, the number of requests may be optimized. If index size is index_size, bucket size is bucket_size, and a reference to the next bucket or object occupies ref_size in a bucket, the number of requests needed to perform one query is roughly log(index_size/ref_size)/log(bucket_size/ref_size). In a practical case of ref_size=30 bytes, index_size=50 GB, bucket_size=110 kb, some embodiments may make three requests to complete a query, each of which transfers ~28 kb of compressed data. The number of requests, in some implementations, grows logarithmically with the index size (or the data size). There are numerous performance and scalability optimizations in various embodiments. Optimizing bucket size for maximum throughput and query performance is expected to improve performance. Further optimizations are also possible. These include the filtering of invalidation messages when an index changes so that the network is not flooded with unnecessary messages, privacy optimizations such as the creation of fake buckets to confuse the server/outside observers, "garbage" filler content in buckets, dummy queries, and the distribution of data across non-colluding servers. For example, the client can create fake buckets that contain no useful data so that a potential attacker doesn't know which nodes contain useful data and which nodes do not and clients may insert nonsense data into nodes to achieve the same. Clients may occasionally send queries to these fake nodes and fake data to further confuse potential attackers and obfuscate the true access frequencies and patterns. Clients may distribute their data across multiple, non-colluding servers so that if one server is somehow compromised, only a portion of their encrypted data and access patterns and frequencies is observable by a potential attacker or unauthorized observer.

Some indexes (such as full-text index) may involve the search of multiple elements in one or multiple B-trees. For example, an index for all the words used in a corpus of text may involve the traversal of B-tree(s) for each of those words. Therefore, indexing a new text document would be relatively slow for some embodiments and use cases, which is not to imply that such examples are outside the scope of some embodiments. For example, if a document has 100 unique words, written to modest B-trees with a height of 3, writing the document may need to begin by reading 300 buckets of B-trees. If done sequentially, indexing such a document would potentially take more than 1 minute (when round-trip time=0.2 s).

Some embodiments may use the fact that the B-tree (or multiple B-Trees) for all these words may be traversed independently. So, in the first query, some embodiments may obtain the first bucket of B-tree for each word (one bucket if words share the same tree), the second query returns the second bucket in tree traversal for each word, etc. In this way, the number of queries drops from the number of unique words in the document multiplied by mean B-tree height (Nw times h) to just h, resulting in an equivalent improvement in query performance.

This optimization method is not limited to full-text search. It can be applied to queries which involve searching for multiple results independently of each other or which use multiple B-trees that can be traversed independently of each other. Indexing of a newly added document can be done in background. Or other embodiments may be optimized for other performance parameters.

The performance of some embodiments may be improved with pre-calculated indices. Analytical queries may relatively slow in some use cases, so some embodiments may expedite analytical queries by recording pre-computed properties into the database index and using advanced data structures.

If the same operation f(o) is to be performed on all objects o in the range (e.g., a Map operation), some embodiments may record pre-computed values of f(o) for each object in the database at the time of creation or update. Then objects selected by any query will contain precomputed properties for operation f.

A different approach may be used to perform an aggregation (e.g., Reduce) query (for example, to calculate sum of values of some field in a range). Typically, many databases calculate aggregations at the time of a query. Some embodiments may create an index that allows users to calculate the sum of any fields for objects in a given range, or to calculate other commutative operations on properties in a given range (such as sum, product, or, XOR, and, count).

By way of example, a pre-computed, indexed sum operation is described. At the time of indexing (e.g., before query time), some embodiments may record the sum of elements in the child node (also referred to as bucket) along with the link to that bucket. If the bucket is a branch node, some embodiments may record the sum of all sums recorded in the bucket. If the bucket is a leaf node, some embodiments may record the sum of all values recorded in that bucket.

Example pseudocode which describes an example algorithm for calculating the sum of elements in a given range is shown below. The code may be used to calculate the sum from field f of object ranging from o start to o end ordered by some field or precomputed property. The example pseudocode is as follows:

```
def get_sum(o_start, o_end):
    find path [root, b[1],...,b[h]] from root to bucket which contains o_start
    result = sum(o.f for all o >= o_start inside b[h])
    for i in range(h-1, 0, -1):
        result += sum(ref.sum for all ref > ref_to(b[i+1]))
    find path [root, c[1],...,c[h]] from root to bucket which contains o_end
    result += sum(ref.sum for all ref > ref_to(b[1]) and ref < ref_to(c[1]))
    for i in range(1, h):
        result += sum(ref.sum for all ref < ref_to(c[i+1]))
    result += sum(o.f for all o <= o_end inside c[h])
    # Now result is sum of all fields f for elements, in the range from
    o_start till o_end
    return result
```

Figure 8:
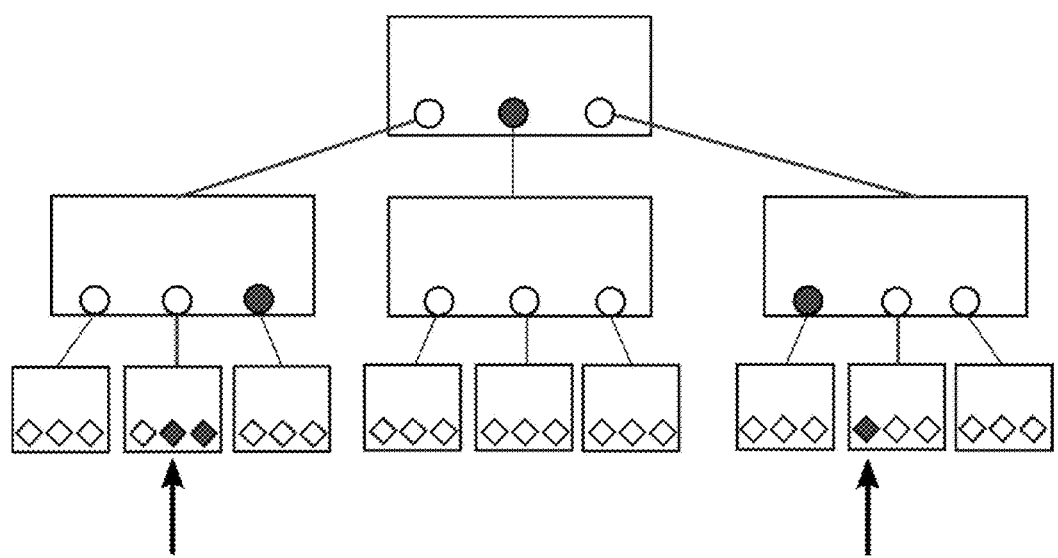
FIG. 8 depicts an example visualization of a commutative aggregation algorithm, wherein values are diamond shaped marks while sums are circles, and filled diamonds and circles are those which are summed up in this example.

FIG. 8 shows some embodiments that download only a number of buckets equal to 2h−1, which is logarithmic to the total number of buckets in the tree.

When the user changes the value of a field in the database or creates a new element, he may update all the sums in the parent buckets in the index. This takes logarithmic time and may use a logarithmic number of client-server interactions.

As mentioned earlier, this method is applicable to other commutative operations, not just sum (though sum is expected to be the most common). In this manner, some embodiments are able to precompute arbitrary Map-type queries and pre-index arbitrary Reduce-type queries to perform them efficiently, in logarithmic time.

Figure 9:
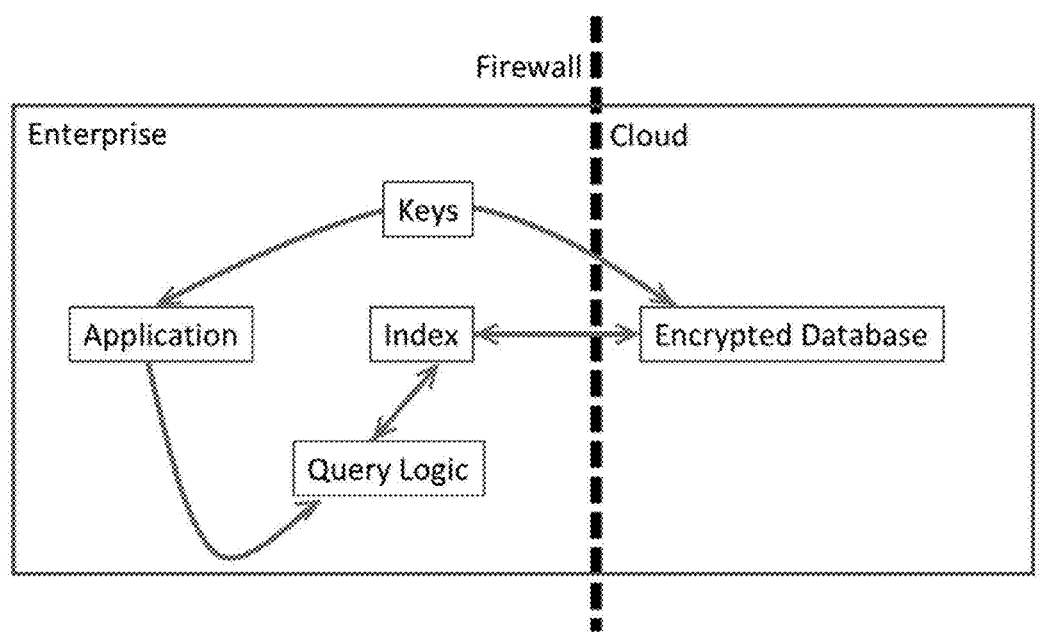
FIG. 9 shows an example of an enterprise-cloud configuration in which the cloud keeps the encrypted database, and the enterprise has the index and query logic and manages the keys.
Figure 10:
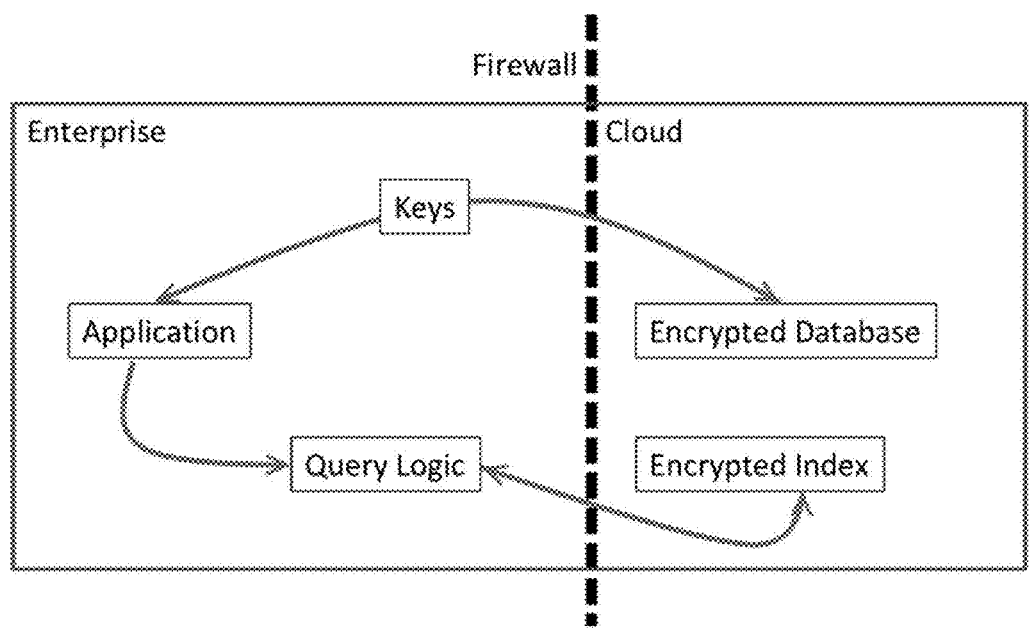
FIG. 10 shows an example of an enterprise-cloud architecture in which the cloud keeps the encrypted database and the encrypted index, the enterprise has the query logic and manages the keys, and an application can encrypt records and sign and hand those records to the server.
Figure 11:
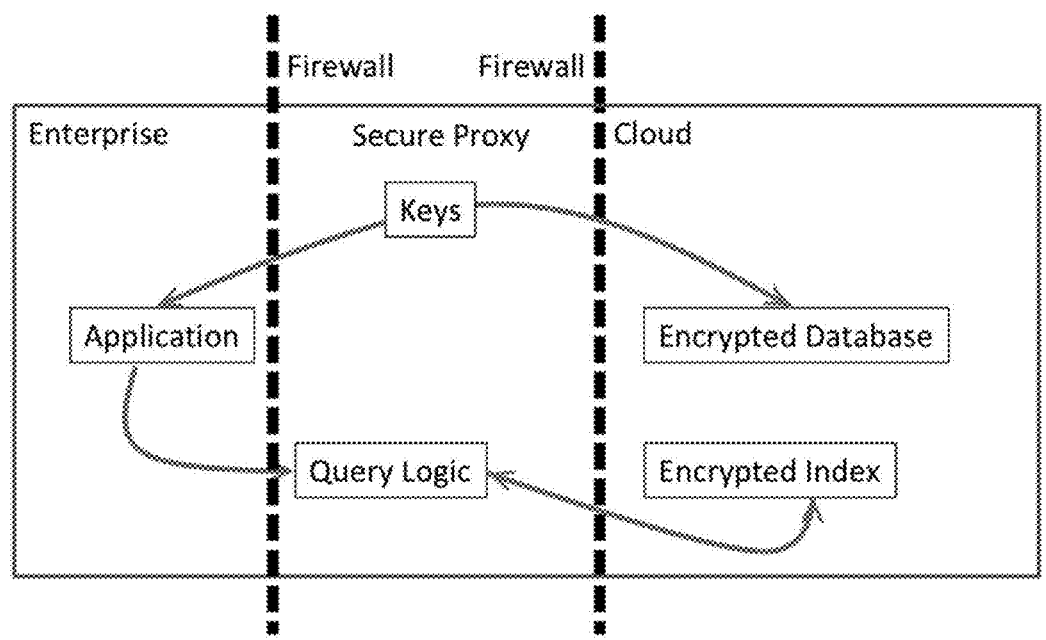
FIG. 11 shows an example of an enterprise-proxy-cloud architecture in which the proxy has the query logic and manages the keys and the cloud keeps the encrypted database and the encrypted index.
Figure 12:
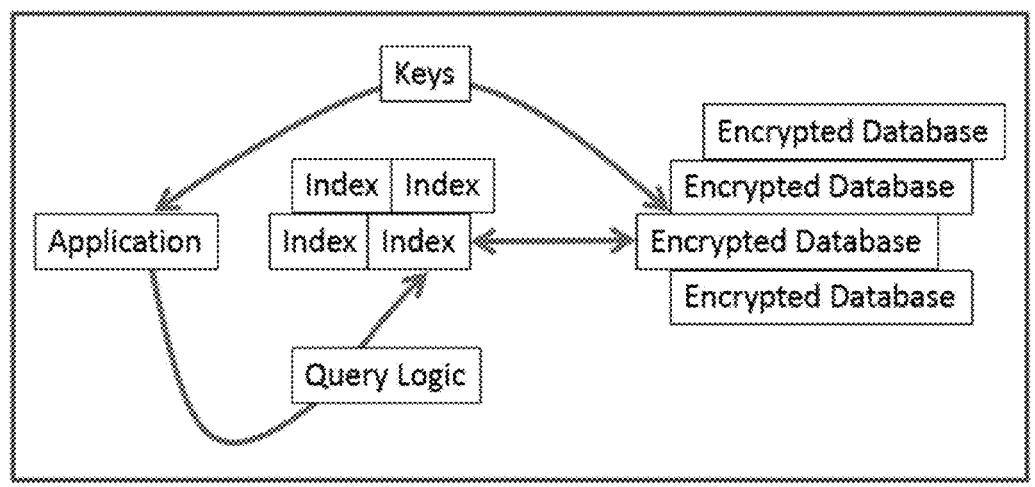
FIG. 12 shows an example of any of the previous architectures in which the encrypted database and index are distributed across multiple, disparate servers.

Examples of alternate architectures are illustrated in FIGS. 9-13. FIG. 9 shows an example of an enterprise-cloud configuration in which the cloud keeps the encrypted database, and the enterprise has the index and query logic and manages the keys. FIG. 10 shows an example of an enterprise-cloud architecture in which the cloud keeps the encrypted database and the encrypted index, the enterprise has the query logic and manages the keys, and an application can encrypt records and sign and hand those records to the server. FIG. 11 shows an example of an enterprise-proxy-cloud architecture in which the proxy has the query logic and manages the keys and the cloud keeps the encrypted database and the encrypted index. FIG. 12 shows an example of any of the previous architectures in which the encrypted database and index are distributed across multiple, disparate servers. In some cases, the encrypted database and index are fragmented.

Figure 13:
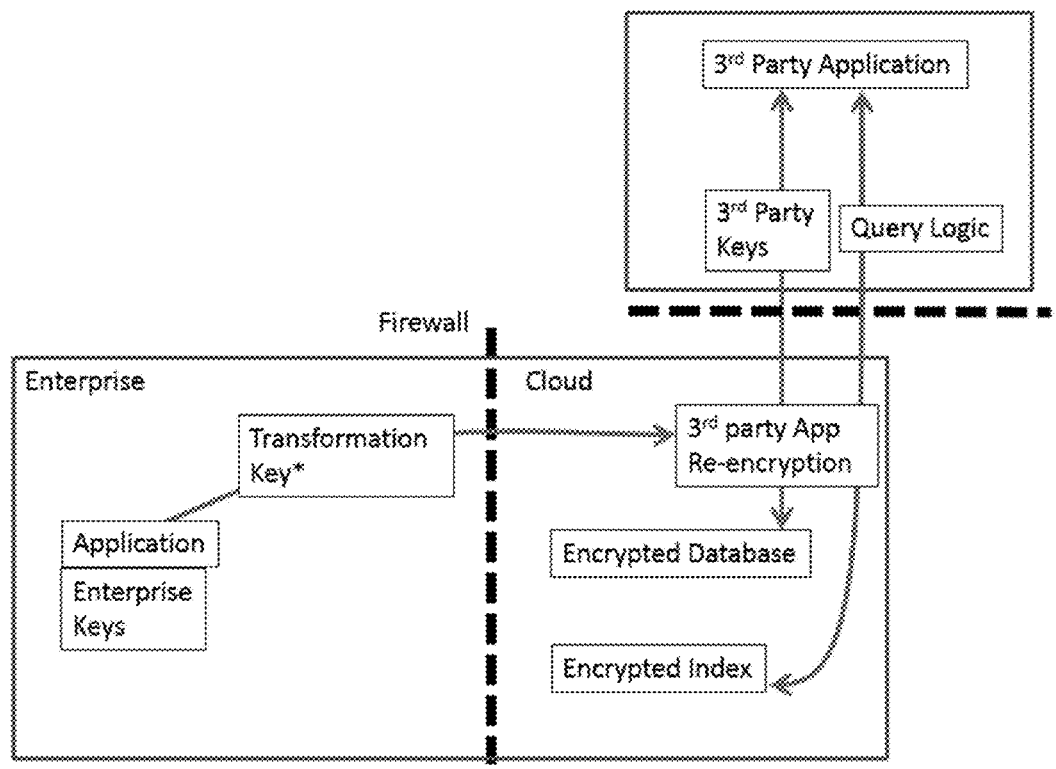
FIG. 13 shows an example of an architecture using proxy re-encryption.

FIG. 13 depicts using proxy reencryption to share data. In some embodiments, the cloud keeps the encrypted database and encrypted index, while a third party performs query logic and provides its public keys. The client that owns the data generates transformation keys from its own private keys and the third party public keys, which allow the server to transform data. The server then transforms the relevant pieces of the client's data and index related to the third party's query so that it is subsequently encrypted under the third party's public keys using proxy reencryption. The third party can also write to the database using this methodology.

In many cases, users desire to share parts of a database with third parties. This may involve sharing part of the data and part of the index. There are multiple possible methods for sharing encrypted data. In some embodiments, a user device may download part of data to be shared and reencrypt it with the third party's (B) public key. In some use cases, this inflicts a significant performance hit since it requires downloading all the shared data and reencrypting locally on the side of data owner (A).

Another method consistent with some embodiments uses the fact that, in some embodiments, data pieces encrypted with asymmetric encryption are encrypted with random content keys which are, in turn, encrypted with the data owner's (A) public key. In this case, data owner A (e.g., a client computing device operated by owner A) may download the encrypted content keys for all the pieces which are to be shared with B, decrypt them with his private key, encrypt them with B's public key and upload them back to the server. Now, when B wants to download the data, the server may give B data pieces encrypted with a content key that is encrypted with B's public key.

A third method uses proxy re-encryption, as show in FIG. 13. It is a method wherein Client device A may compute locally a transformation key kT based on his private key and client device B's public key, which B then sends to the server. The server then applies this transformation to the data (or content key), after which it is encrypted with B's public key, without the server knowing either parties private key or the data. In the case of a database, some embodiments may share not only the data but also the index to search that data. One way to share pieces of the index related to a query which determines which data to share is when data owner A reads the fraction of the B-Tree related to the search query. Data owner A decrypts that part of the index, encrypts it with the public key of B and uploads it back to the server. Simultaneously or concurrently, client device A figures out which data is related to this search query and encrypts it for third party B, or uses proxy reencryption as per the methods described above.

Figure 14:
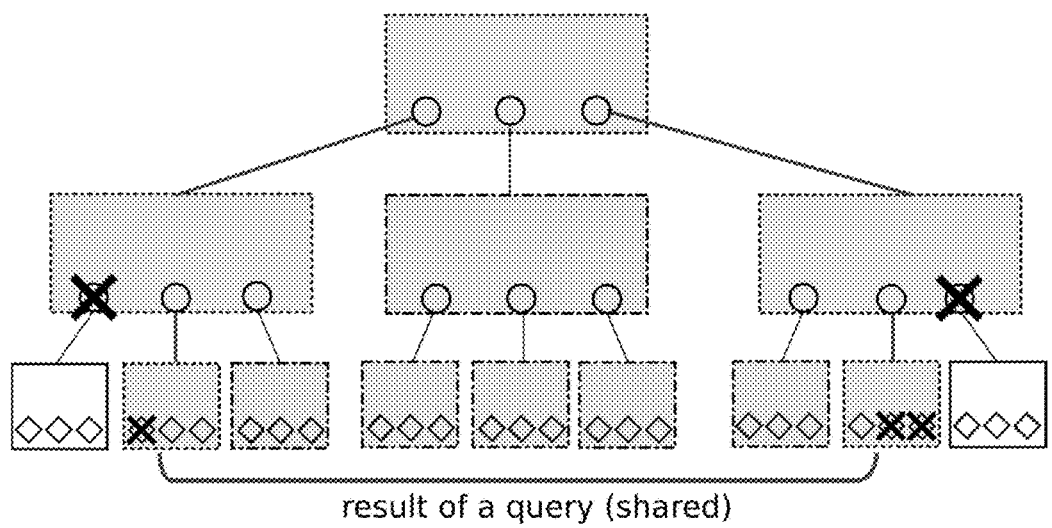
FIG. 14 shows a tree data structure in which a query is performed on shared data.

In some cases, the fraction of the B-Tree related to the query is too big to read. In this case, some embodiments may execute the following (as shown in FIG. 14). FIG. 14 depicts sharing a fraction of an index with a third party. Buckets to change are depicted with dotted lines. Buckets to be reencrypted on the server using proxy reencryption are depicted with dot-dashed lines. Buckets which are on the path which leads to the beginning and the end of the range that is to be shared are duplicated by A locally, and the duplicates are modified to include only references related to the shared range, in some embodiments. In some implementations, all the buckets inside the "triangle" whose boundaries are formed by those paths are guaranteed to belong to the shared range and can be reencrypted on the server using proxy reencryption. When data owner A shares a fraction of index, it does not know all its bucket IDs in advance unless A reads all fractions of the index related to his query. If reading this fraction is undesirable, the following methods are consistent with some embodiments:

1. Some embodiments do not restrict access of the third party to buckets or objects once third party knows IDs. The server reencrypts buckets or objects on demand, using proxy reencryption. IDs are chosen completely at random and from a large range, so that it is not practical to brute-force any IDs to get any data.
2. Every object and bucket has a reference to the bucket which refers to it, this reference is visible to the server. This method may be used when opening this information to the server is acceptable.
3. A more compact tree which stores only information about children but no information about ordering or values is stored on the server, encrypted with a key of data owner A. The data owner A uses this tree remotely, similarly to a B-Tree, to determine only IDs of all children of any bucket, starting with a given reference.

Some embodiments provide end-to-end encryption for databases by performing encryption and query logic on the client. Some embodiments accomplish this by rearchitecting traditional DBMS systems in order to divorce query logic and data storage. In some examples, the database server has zero-knowledge about the data it is storing. Additionally, some examples incorporate obfuscation techniques, which are used to prevent the server from gaining insight into the structure of the data over time by examining queries and their associated request patterns.

Aspects of an embodiment of the above-described techniques are described in greater detail in a whitepaper titled "ZeroDB Whitepaper," by Michael Egorov and MacLane Wilkison, submitted on 23 Feb. 2016 (v1) to ArXiv.org, under the Computer Science heading, in the form last revised 8 Mar. 2016 (v3), labeled arXiv: 1602.07168v3 [cs.CR], the contents of which are incorporated by reference in their entirety.

Figure 15:
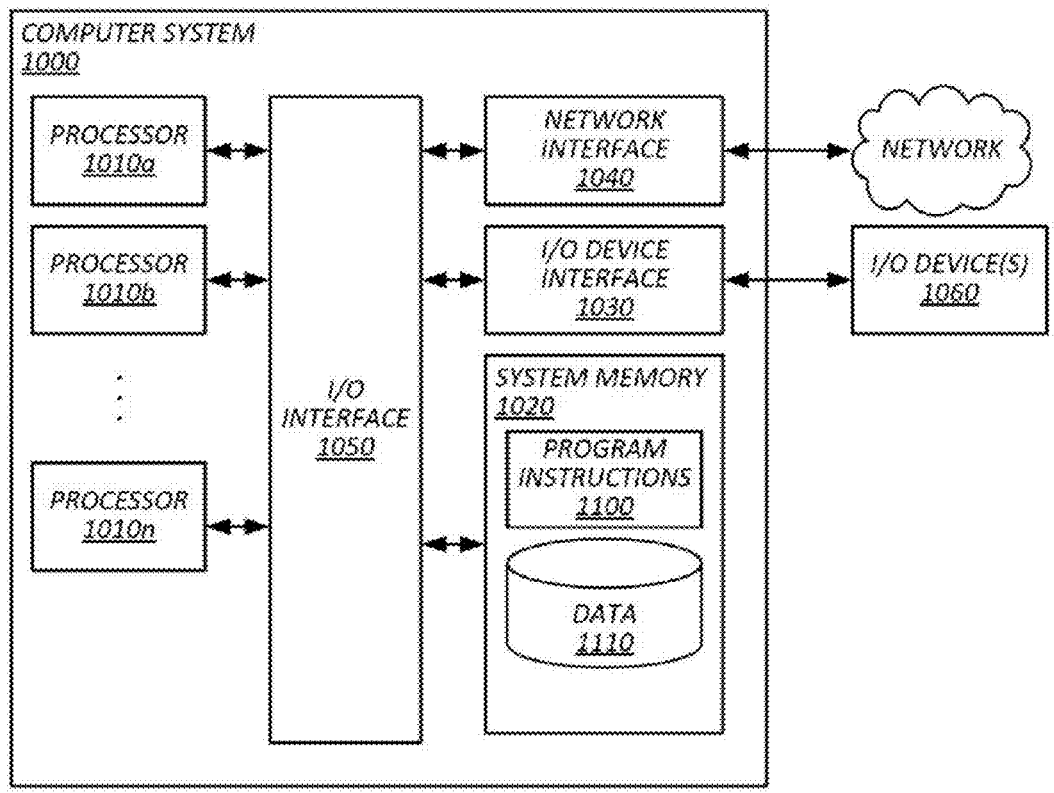
FIG. 15 depicts an example computer system by which a client or server component of the above systems and methods may be implemented.

FIG. 15 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry (e.g., an FPGA (field programmable gate array) or an ASIC (application specific integrated circuit)). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices).

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010*a*-1010*n*). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. As would be understood by one of ordinary skill in the art, references to a "medium" having instructions includes scenarios in which the medium is distributed among a plurality of computing devices, with different computing devices having different subsets or instances of the instructions.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

Some of the present techniques will be better understood in view of the following enumerated embodiments:

1. A method of operating a client-side of a zero-knowledge database, the method comprising: obtaining, with a first computing system, a request for data in a database stored by an untrusted computing system remote from the first computing system, wherein the database is stored in a graph that includes a plurality of connected nodes, each of the nodes including: an identifier, accessible to the untrusted computing system, that distinguishes the respective node from other nodes in the graph; and an encrypted collection of data stored in encrypted form by the untrusted computing system, wherein: the untrusted computing system does not have access to an encryption key to decrypt the collections of data, the encrypted collections of data in at least some of the plurality of nodes each include a plurality of keys indicating subsets of records in the database accessible via other nodes in the graph and corresponding pointers to identifiers of the other nodes, and the encrypted collections of data in at least some of the plurality of nodes each include records of the database, at least some of the records including the requested data; sending, from the first computing system to the untrusted computing system, a request for a first node of the graph stored by the untrusted computing system; receiving, with the first computing system, the encrypted collection of data of the first node; obtaining, with the first computing system, one or more decryption keys; decrypting, with the first computing system, the encrypted collection of data of the first node with at least some of the one or more decryption keys to obtain a first decrypted collection of data; selecting, with the first computing system, an identifier of a second node in the graph from the first decrypted collection of data based on correspondence between the requested data in the remotely stored database and a key in the first decrypted collection of data associated with the selected identifier; sending, from the first computing system to the untrusted computing system, a request for the second node with a transmission indicating the selected identifier; and receiving, with the first computing system, the encrypted collection of data of the second node; decrypting, with the first computing system, with at least some of the one or more decryption keys, the encrypted collection of data of the second node to obtain a second decrypted collection of data; and obtaining the requested data remotely stored in the database based on information in the second decrypted collection of data.

2. The method of embodiment 1, wherein the first computing system includes a computing device storing the one or more decryption keys and operative to decrypt the encrypted collections of data stored in nodes of the graph stored by the untrusted computing system, and wherein the encrypted form is a nondeterministic form of encryption.

3. The method of any of embodiments 1-2, wherein the graph is an acyclic directed graph, and wherein a plurality of the connections between the nodes of the graph are not accessible to the untrusted computing system, at least in part, because the plurality of the connections are stored in the encrypted collections of data.

4. The method of any of embodiments 1-3, wherein the graph comprises a forest graph having a plurality of unconnected trees.

5. The method of any of embodiments 1-4, wherein the graph is a hierarchical arrangement of nodes, the arrangement comprising: a root node; children nodes having identifiers among the encrypted collection of data of respective parent nodes; and leaf nodes having no children nodes, wherein: every node has at most a threshold amount of children; every non-leaf, non-root node has at least a threshold fraction of the threshold amount of children; and all leaf nodes are in the same level of the hierarchical arrangement.

6. The method of any of embodiments 1-5, comprising: obtaining, with the first computing system, a value to be written to a given node of the graph; obtaining, with the first computing system from the untrusted computing system, the given encrypted collection of data of the given node of the graph; decrypting, with the first computing system, the given encrypted collection of data to obtain a given decrypted collection of data determining, with the first computing system, that inserting a value into the given decrypted collection of data of a given node will cause the given node to have more than a threshold amount of values; and in response to the determination, with the first computing system, creating two nodes by performing steps comprising: allocating some of the values in the given node to a first new node; allocating some of the values in the given node to a second new node; including the value to be written in the first new node or second new node; obtaining identifiers for the first new node and the second new node; determining that adding the identifiers for the first new node and the second new node to the encrypted collection of data of a parent node by which the given node was identified will not cause the encrypted collection of data of the parent node to have more than the threshold amount of values; in response to determining that the parent node will not exceed the threshold, including the identifiers for the first new node and the second new node in the encrypted collection of data of the parent node and an association between the added identifiers and respective ranges of values stored by the first new node and the second new node; encrypting the first new mode; after encrypting the first new node, sending the first new node to the untrusted computing system for storage; encrypting the second new node; after encrypting the second new node, sending the second new node to the untrusted computing system for storage; encrypting the parent node; and after encrypting the parent node, sending the parent node to the untrusted computing system for storage.

7. The method of any of embodiments 1-6, wherein obtaining, with a first computing system, a request for data in a database stored by an untrusted computing system remote from the first computing system, comprises: receiving, with a query-language-translation computing component in the first computing system, a structured query language (SQL) query from a client computing device in the first computing system; and translating, with the query-language-translation computing component, the SQL query into a plurality of request for data including the obtained request for data, the method further comprising: obtaining responsive data for each of the plurality of requests for data at the query-language-translation computing component; and sending a response to the query including at least some of the responsive data to the client device from the query-language-translation computing component.

8. The method of any of embodiments 1-7, wherein: obtaining, with a first computing system, a request for data in a database stored by an untrusted computing system remote from the first computing system, comprises: receiving, with a security-broker computing device in the first computing system, a query from a client computing device in the first computing system; and decrypting, with the first computing system, the encrypted collection of data of the first node to obtain a first decrypted collection of data, comprises: decrypting the encrypted collection of data with the security-broker computing device and sending at least some of the first decrypted collection of data to the client computing device via a private network of the first computing system, wherein the client computing device does not have access to at least some of the one or more decryption keys.

9. The method of any of embodiments 1-8, comprising: reading multiple nodes concurrently, with the first computing system, to construct an index; encrypting the index in one or more nodes; and sending the one or more nodes to the untrusted computing system for storage.

10. The method of any of embodiments 1-9, comprising: pre-computing responses to analytical queries with the first computing system; encrypting the pre-computed responses in one or more nodes with the first computing system; and sending the encrypted one or more nodes from the first computing system to the untrusted computing system for storage.

11. The method of any of embodiments 1-10, wherein the database comprises a public portion stored by the untrusted computing system that is stored in unencrypted form or encrypted in a form for which the untrusted computing system has access to a decryption key to decrypt the public portion, the method comprising: obtaining, with the first computing system, another request for other data stored in the public portion; sending, from the first computing system to the untrusted computing system, the other request; and receiving the other data after the untrusted computing system executes query logic to retrieve the other data.

12. The method of any of embodiments 1-11, comprising: after sending, from the first computing system to the untrusted computing system, the request for the first node, receiving the request at a firewall separating an unsecured network from a secured network in which at least part of the first computing system is disposed, and sending the request for the first node to the untrusted computing system from the firewall via the unsecured network.

13. The method of any of embodiments 1-12, comprising: executing query logic on the second decrypted collection of data with a computing device of the first computing system.

14. The method of embodiment 13, wherein executing the query logic comprises: determining whether values in the second decrypted collection of data match a target value specified by a SQL query.

15. The method of embodiment 13, wherein executing the query logic comprises: determining whether a value in the second decrypted collection of data is greater than or is less than a comparison value specified by a database query.

16. The method of any of embodiments 1-15, comprising: sending, from the first computing system to the untrusted computing system, a request for a third node unrelated to the request for data to obfuscate to the untrusted computing system which node includes the requested data.

17. The method of any of embodiments 1-16, comprising: storing, with the first computing system, at least part of the data in the first node in a cache memory of the first computing system; obtaining another request for data with the first computing system; determining, based on the stored at least part of the data in the first node in the cache memory, that the first node contains pointers to identifiers of other nodes that either contain the other requested data or point to a path through the graph to the other requested data; selecting a pointer to another node in the graph from the cache memory, the pointer specifying an identifier of the other node; and sending, from the first computing system to the untrusted computing system, a request for the other node based on the selected pointer.

18. The method of any of embodiments 1-17, comprising: receiving, with the first computing system from the untrusted computing system, a message indicating that the at least part of the data in the first node in the cache memory does not match a more current version of the first node stored by the untrusted computing system; and in response to the message, expiring the at least part of the data in the first node in the cache memory.

19. The method of any of embodiments 1-18, wherein the first computing system comprises: a plurality of computing devices connected by one or more networks, each of the computing devices having an operating system and one or more applications executing on the operating system, wherein at least some of the computing devices are servers; a distributed business application executing on at least some of the plurality of computing devices, wherein at least some data of the distributed business application is stored in the untrusted computing system.

20. A method of operating a database, the method comprising: obtaining, with an untrusted computing system remote from a first computing system, a database stored in a graph that includes a plurality of connected nodes, each of the nodes including: an identifier, accessible to the untrusted computing system, that distinguishes the respective node from other nodes in the graph; and an encrypted collection of data stored in encrypted form by the untrusted computing system, wherein: the untrusted computing system does not have access to an encryption key to decrypt the collections of data, the encrypted collections of data in at least some of the plurality of nodes each include a plurality of keys indicating subsets of records in the database accessible via other nodes in the graph and corresponding pointers to identifiers of the other nodes, and the encrypted collections of data in at least some of the plurality of nodes each include records of the database, at least some of the records including the requested data; receiving a request for a first node among the plurality of connected nodes from the first computing system; sending the first node to the first computing system; receiving a request for a second node among the plurality of connected nodes from the first computing system; sending the second node to the first computing system; receiving an indication that the first computing system will write to, or has written to, the second node; in response to the indication, sending a message to a computing device storing at least part of the second node in cache memory indicating that values in cache memory are potentially inconsistent with the current version of the second node.

21. A tangible, non-transitory, machine-readable medium storing instructions that when executed by a data processing apparatus cause the data processing apparatus to perform operations comprising: the steps of any of embodiments 1-20.

22. A system, comprising:
one or more processors; and
memory storing instructions that when executed by the processors cause the processors to effectuate operations comprising: the steps of any of embodiments 1-20.

What is claimed is:
1. A method of hosting a zero-knowledge database, the method comprising:
storing, in a hosting computer system, a database having a plurality of payloads, wherein:
each payload has an identifier unique to that payload among the plurality of payloads,
each payload is stored in a non-deterministic encrypted format,
at least some of the payloads have encrypted pointers to identifiers of other payloads, and
at least some of the payloads have encrypted data written to the database at the instruction of one or more client computing devices;
receiving, with the hosting computer system, a write request from a client computing device;
obtaining, with the hosting computer system, a given identifier of a given payload among the payloads based on the write request;
querying, with the hosting computer system, transaction records referencing the given identifier in a transaction log to obtain transactions corresponding to write requests involving the given payload;
determining, with the hosting computer system, that no responsive transactions records indicate a started but not completed write operation;
in response to the determination, with the hosting computer system:
sending the given payload to the requesting client computing device without decrypting the given payload by the hosting computer system;
writing a transaction record to the transaction log indicating the given payload is undergoing a write operation;
receiving, in the encrypted format, a new version of the payload sent by the client computing device, the new version being received in a non-deterministic encrypted format;
writing a transaction record to the transaction log indicating that the write operation is completed; and
storing the new version of the payload in the database without decrypting the new version of the payload with the hosting computer system.

2. The method of claim 1, further comprising:
accessing a record identifying other computing devices having a cached version of the given payload; and
sending messages to the other computer devices to expire the cached version of the payload.

3. The method of claim 1, further comprising:
detecting overlapping write operations on another given payload requested by different client computing devices; and
in response the detecting overlapping write operations, treating the first write operation requested between the overlapping write operations as authoritative.

4. The method of claim 1, further comprising:
detecting overlapping write operations on another given payload requested by different client computing devices; and
in response the detecting overlapping write operations, treating the first write operation completed between the overlapping write operations as authoritative.

5. The method of claim 1, wherein:
at least some of the encrypted pointers in the payloads have encrypted index values indicating ranges of values of the data written to the database at the instruction of one or more client computing devices, the ranges of values being ranges of the data accessible via a respective payload identified by the respective pointer.

6. The method of claim 1, further comprising:
receiving a read request sent by another client computing device, the read request indicating a root payload in a hierarchy of the payloads;
sending the root payload to the other client computing device;
receiving a read request from the other client computing device for an intermediate payload in the hierarchy of payloads;
sending the intermediate payload to the other client computing device;
receiving a read request from the other client computing device for a leaf payload in the hierarchy of payloads; and sending the leaf payload to the other client computing device, wherein none of the root payload, the intermediate payload, or the leaf payload is decrypted by the hosting computer system, and wherein the hosting computer system does not have keys to decrypt the payloads.

7. The method of claim 1, further comprising:
receiving a read request from another client computing device after sending the given payload and before writing a transaction record to the transaction log indicating that the write operation is completed;
determining that the read request identifies the given payload; and
sending an indication to the other client computing device indicating that the given payload is undergoing a write operation.

8. The method of claim 1, further comprising providing access to a tangible, non-transitory machine readable medium storing instructions that when executed by one or more client computing devices effectuate operations comprising:
performing steps for obfuscate access frequencies and patterns.

9. The method of claim 1, further comprising providing access to a tangible, non-transitory machine readable medium storing instructions that when executed by one or more client computing devices effectuate operations comprising:
performing steps for encrypting the given payload.

10. The method of claim 1, further comprising providing access to a tangible, non-transitory machine readable medium storing instructions that when executed by one or more client computing devices effectuate operations comprising:
decrypting the given payload;
adding, removing, or changing data in the given payload;
adding padding to the given payload with means for generating a random number with hardware.

11. The method of claim 1, further comprising providing access to a tangible, non-transitory machine readable medium storing instructions that when executed by one or more client computing devices effectuate operations comprising:
performing steps for writing data to a balanced tree.

12. The method of claim 1, further comprising providing access to a tangible, non-transitory machine readable medium storing instructions that when executed by one or more client computing devices effectuate operations comprising:
performing steps for optimizing a number of requests for payloads by the client computing device.

13. The method of claim 1, further comprising providing access to a tangible, non-transitory machine readable medium storing instructions that when executed by one or more client computing devices effectuate operations comprising:
performing steps for sharing parts of the database with other computing devices.

14. A tangible, non-transitory, machine readable medium storing instructions that when executed by one or more computing devices effectuate operations comprising:
storing, in a hosting computer system, a database having a plurality of payloads, wherein:
each payload has an identifier unique to that payload among the plurality of payloads,
each payload is stored in a non-deterministic encrypted format,
at least some of the payloads have encrypted pointers to identifiers of other payloads, and
at least some of the payloads have encrypted data written to the database at the instruction of one or more client computing devices;
receiving, with the hosting computer system, a write request from a client computing device;
obtaining, with the hosting computer system, a given identifier of a given payload among the payloads based on the write request;
querying, with the hosting computer system, transaction records referencing the given identifier in a transaction log to obtain transactions corresponding to write requests involving the given payload;
determining, with the hosting computer system, that no responsive transactions records indicate a started but not completed write operation;
in response to the determination, with the hosting computer system:
sending the given payload to the requesting client computing device without decrypting the given payload by the hosting computer system;
writing a transaction record to the transaction log indicating the given payload is undergoing a write operation;
receiving, in the encrypted format, a new version of the payload sent by the client computing device, the new version being received in a non-deterministic encrypted format;
writing a transaction record to the transaction log indicating that the write operation is completed; and
storing the new version of the payload in the database without decrypting the new version of the payload with the hosting computer system.

15. The medium of claim 14, the operations further comprising:
accessing a record identifying other computing devices having a cached version of the given payload; and
sending messages to the other computer devices to expire the cached version of the payload.

16. The medium of claim 14, the operations further comprising:
detecting overlapping write operations on another given payload requested by different client computing devices; and
in response the detecting overlapping write operations, treating the first write operation requested between the overlapping write operations as authoritative.

17. The medium of claim 14, the operations further comprising:
detecting overlapping write operations on another given payload requested by different client computing devices; and
in response the detecting overlapping write operations, treating the first write operation completed between the overlapping write operations as authoritative.

18. The medium of claim 14, wherein:
at least some of the encrypted pointers in the payloads have encrypted index values indicating ranges of values of the data written to the database at the instruction of one or more client computing devices, the ranges of values being ranges of the data accessible via a payload identified by the respective pointer.

19. The medium of claim 14, the operations further comprising:

receiving a read request sent by another client computing device, the read request indicating a root payload in a hierarchy of the payloads;

sending the root payload to the other client computing device;

receiving a read request from the other client computing device for an intermediate payload in the hierarchy of payloads;

sending the intermediate payload to the other client computing device;

receiving a read request from the other client computing device for a leaf payload in the hierarchy of payloads; and sending the leaf payload to the other client computing device, wherein none of the root payload, the intermediate payload, or the leaf payload is decrypted by the hosting computer system, and wherein the hosting computer system does not have keys to decrypt the payloads.

20. The medium of claim 14, the operations further comprising:

receiving a read request from another client computing device after sending the given payload and before writing a transaction record to the transaction log indicating that the write operation is completed;

determining that the read request identifies the given payload; and sending an indication to the other client computing device indicating that the given payload is undergoing a write operation.

21. The medium of claim 14, the operations further comprising:

steps for obfuscate access frequencies and patterns.

22. The medium of claim 14, the operations further comprising:

steps for encrypting the given payload.

23. The medium of claim 14, the operations further comprising:

decrypting the given payload;

adding, removing, or changing data in the given payload; and adding padding to the given payload with means for generating a random number with hardware.

24. The medium of claim 14, the operations further comprising:

steps for writing data to a balanced tree.

25. The medium of claim 14, the operations further comprising:

steps for optimizing a number of requests for payloads by the client computing device.

26. The medium of claim 14, the operations further comprising:

steps for sharing parts of the database with other computing devices.

* * * * *